(12) United States Patent
Mahkonen et al.

(10) Patent No.: US 11,817,001 B2
(45) Date of Patent: Nov. 14, 2023

(54) BROADCASTING GEOLOCATION INFORMATION IN A RADIO FRAME TRANSMITTED FROM AN UNMANNED AERIAL VEHICLE

(71) Applicant: Telefonaktiebolaget LM Ericsson (publ), Stockholm (SE)

(72) Inventors: Heikki Mahkonen, San Jose, CA (US); Ravi Manghirmalani, Fremont, CA (US); Attila Takács, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 183 days.

(21) Appl. No.: 16/499,202

(22) PCT Filed: Jun. 12, 2017

(86) PCT No.: PCT/IB2017/053477
§ 371 (c)(1),
(2) Date: Sep. 27, 2019

(87) PCT Pub. No.: WO2018/178751
PCT Pub. Date: Oct. 4, 2018

(65) Prior Publication Data
US 2020/0105151 A1    Apr. 2, 2020

Related U.S. Application Data

(60) Provisional application No. 62/480,347, filed on Mar. 31, 2017.

(51) Int. Cl.
*G08G 5/04* (2006.01)
*H04W 4/42* (2018.01)
(Continued)

(52) U.S. Cl.
CPC ........... *G08G 5/045* (2013.01); *B64C 39/024* (2013.01); *G08G 5/0008* (2013.01);
(Continued)

(58) Field of Classification Search
CPC ...................................................... G98G 5/045
See application file for complete search history.

(56) References Cited

U.S. PATENT DOCUMENTS 7,813,326 B1    10/2010  Kelm et al.
9,244,155 B2    1/2016   Bielas
(Continued)

FOREIGN PATENT DOCUMENTS

CN    1611036 A    4/2005
CN    101836478 A    9/2010
(Continued)

OTHER PUBLICATIONS

Wikipedia, "Global Positioning System", available online at <https://en.wikipedia.org/w/index.php?title=Global_Positioning_System&oldid=917890871>, Sep. 26, 2019, 36 pages.
(Continued)

*Primary Examiner* — Jean Paul Cass
(74) *Attorney, Agent, or Firm* — Nicholson De Vos Webster & Elliott LLP

(57) ABSTRACT

Broadcasting geolocation information of an Unmanned Aerial Vehicle (UAV) from the UAV by determining current geolocation of the UAV by communicating with a geolocation service and utilizing the geolocation service to geolocate the UAV. Then the UAV prepares a radio frame that includes geolocation information identifying the current geolocation of the UAV and other information associated with the UAV using a radio protocol of one of a 3rd Generation Partnership Project (3GPP) radio protocol, a WiFi radio protocol, a wireless personal area network pro-
(Continued)

tocol and a low-power wide-area network protocol and transmits the radio frame to broadcast the current geolocation of the UAV.

14 Claims, 13 Drawing Sheets

(51) Int. Cl.
  *B64C 39/02* (2023.01)
  *G08G 5/00* (2006.01)
  *H04W 4/02* (2018.01)
  *H04W 72/30* (2023.01)

(52) U.S. Cl.
  CPC ......... *G08G 5/0013* (2013.01); *G08G 5/0069* (2013.01); *H04W 4/027* (2013.01); *H04W 4/42* (2018.02); *H04W 72/30* (2023.01); *B64U 2201/20* (2023.01)

(56) References Cited

U.S. PATENT DOCUMENTS

| | | | |
|---|---|---|---|
| 9,363,690 B1 | 6/2016 | Singh et al. | |
| 9,412,278 B1 | 8/2016 | Gong et al. | |
| 9,434,267 B2* | 9/2016 | Wang | B64D 27/24 |
| 9,467,922 B1 | 10/2016 | Buchmueller et al. | |
| 9,537,561 B1 | 1/2017 | Kotecha et al. | |
| 9,588,516 B1 | 3/2017 | Gurel et al. | |
| 9,609,288 B1 | 3/2017 | Richman et al. | |
| 9,709,409 B2 | 7/2017 | Dave et al. | |
| 9,714,012 B1* | 7/2017 | Hoareau | B64D 1/02 |
| 9,764,703 B2* | 9/2017 | Hoareau | B60L 50/00 |
| 9,815,633 B1* | 11/2017 | Kisser | B65G 37/02 |
| 9,882,640 B1* | 1/2018 | Chaudhuri | H04W 48/20 |
| 9,950,814 B1* | 4/2018 | Beckman | B64F 1/22 |
| 10,023,309 B2* | 7/2018 | Brown | A63H 27/12 |
| 10,142,019 B2* | 11/2018 | Chaudhuri | H04B 10/116 |
| 10,153,837 B2* | 12/2018 | Chaudhuri | H04W 24/10 |
| 10,195,952 B2* | 2/2019 | Wang | B60L 53/126 |
| 10,332,405 B2* | 6/2019 | Kopardekar | G08G 5/0091 |
| 10,363,826 B2* | 7/2019 | Wang | B64F 1/007 |
| 10,373,487 B2* | 8/2019 | Kim | H04B 10/116 |
| 10,383,081 B2* | 8/2019 | Edge | H04W 8/02 |
| 10,384,692 B2* | 8/2019 | Beckman | B25J 11/00 |
| 10,416,666 B2 | 9/2019 | Rosenberg | |
| 10,421,542 B2* | 9/2019 | Beckman | G08G 5/0069 |
| 10,453,348 B2* | 10/2019 | Speasl | B64U 80/82 |
| 10,467,685 B1* | 11/2019 | Brisson | G06Q 30/0645 |
| 10,493,863 B1* | 12/2019 | Thrun | B64C 29/0091 |
| 10,532,815 B1* | 1/2020 | Thrun | B64F 1/362 |
| 10,614,515 B1* | 4/2020 | Brisson | B64F 1/00 |
| 10,661,896 B2* | 5/2020 | Ozaki | B64U 10/13 |
| 10,703,480 B1* | 7/2020 | Thrun | B64U 70/20 |
| 10,899,473 B2* | 1/2021 | Scherz | B64U 50/19 |
| 10,953,754 B1* | 3/2021 | Wiegman | B60L 50/50 |
| 10,974,911 B2* | 4/2021 | Zevenbergen | B64F 1/22 |
| 10,999,851 B2* | 5/2021 | Basu Mallick | H04W 64/00 |
| 11,044,192 B2* | 6/2021 | Kim | H04L 1/0059 |
| 2004/0156399 A1 | 8/2004 | Eran | |
| 2007/0284474 A1 | 12/2007 | Olson et al. | |
| 2009/0248287 A1 | 10/2009 | Limbaugh et al. | |
| 2010/0062774 A1 | 3/2010 | Motegi et al. | |
| 2010/0085236 A1 | 4/2010 | Franceschini et al. | |
| 2010/0153001 A1 | 6/2010 | Bauchot et al. | |
| 2010/0254346 A1 | 10/2010 | Jain et al. | |
| 2012/0200449 A1 | 8/2012 | Bielas | |
| 2012/0225675 A1 | 9/2012 | Nishida et al. | |
| 2014/0032034 A1* | 1/2014 | Raptopoulos | H04B 7/18506 701/25 |
| 2015/0038140 A1 | 2/2015 | Kilpatrick et al. | |
| 2015/0119043 A1 | 4/2015 | Gopal et al. | |
| 2015/0142211 A1* | 5/2015 | Shehata | H04W 4/027 701/2 |
| 2015/0208300 A1 | 7/2015 | McLaughlin et al. | |
| 2015/0312813 A1 | 10/2015 | Xu et al. | |
| 2016/0065345 A1 | 3/2016 | Kim et al. | |
| 2016/0070265 A1 | 3/2016 | Liu et al. | |
| 2016/0125740 A1 | 5/2016 | Pasko et al. | |
| 2016/0140851 A1 | 5/2016 | Levy et al. | |
| 2016/0142211 A1* | 5/2016 | Metke | H04L 9/3268 713/175 |
| 2016/0142944 A1 | 5/2016 | Cao | |
| 2016/0142994 A1 | 5/2016 | Luo et al. | |
| 2016/0161258 A1 | 6/2016 | Magson et al. | |
| 2016/0200421 A1* | 7/2016 | Morrison | B64D 27/24 244/17.23 |
| 2016/0266579 A1 | 9/2016 | Chen et al. | |
| 2016/0270062 A1* | 9/2016 | Dinan | H04W 72/21 |
| 2016/0284221 A1 | 9/2016 | Hinkle et al. | |
| 2016/0292403 A1 | 10/2016 | Gong et al. | |
| 2016/0300493 A1 | 10/2016 | Ubhi et al. | |
| 2016/0300495 A1 | 10/2016 | Kantor et al. | |
| 2016/0358187 A1 | 12/2016 | Radocchia et al. | |
| 2016/0363929 A1 | 12/2016 | Clark et al. | |
| 2016/0371985 A1 | 12/2016 | Kotecha | |
| 2016/0371987 A1 | 12/2016 | Kotecha | |
| 2016/0380692 A1 | 12/2016 | Jalali et al. | |
| 2017/0023939 A1 | 1/2017 | Leonard et al. | |
| 2017/0045884 A1 | 2/2017 | Kablaoui | |
| 2017/0081026 A1 | 3/2017 | Winn et al. | |
| 2017/0092137 A1 | 3/2017 | Hiebl | |
| 2017/0124884 A1* | 5/2017 | Shaw | G08G 5/0069 |
| 2017/0142766 A1 | 5/2017 | Kim | |
| 2017/0150373 A1 | 5/2017 | Brennan et al. | |
| 2017/0168480 A1 | 6/2017 | Wanstedt et al. | |
| 2017/0295458 A1* | 10/2017 | Gao | H04W 64/00 |
| 2017/0323572 A1* | 11/2017 | Chan | G08G 5/0026 |
| 2017/0374572 A1* | 12/2017 | Kleinbeck | H04W 24/10 |
| 2018/0086456 A1* | 3/2018 | Burch, V | B64U 50/19 |
| 2018/0086483 A1 | 3/2018 | Priest et al. | |
| 2018/0152510 A1 | 5/2018 | Newton et al. | |
| 2018/0181117 A1 | 6/2018 | Rosenberg | |
| 2018/0206083 A1* | 7/2018 | Kumar | H04W 4/33 |
| 2018/0247544 A1 | 8/2018 | Mustafic et al. | |
| 2018/0279348 A1 | 9/2018 | Huang et al. | |
| 2019/0012923 A1 | 1/2019 | Weisbrod et al. | |
| 2019/0087576 A1 | 3/2019 | Olson | |
| 2019/0149417 A1* | 5/2019 | Augusto Lopes | H04L 41/0886 370/254 |
| 2019/0289505 A1 | 9/2019 | Thomas et al. | |
| 2019/0329877 A1* | 10/2019 | Benson | B64C 11/28 |
| 2019/0364492 A1 | 11/2019 | Azizi et al. | |
| 2020/0005651 A1 | 1/2020 | Priest | |
| 2020/0105149 A1 | 4/2020 | Mahkonen et al. | |
| 2020/0193844 A1 | 6/2020 | Mahkonen et al. | |
| 2020/0301445 A1* | 9/2020 | Jourdan | G06K 7/1417 |
| 2021/0086370 A1 | 3/2021 | Zhang et al. | |

FOREIGN PATENT DOCUMENTS

| | | |
|---|---|---|
| CN | 104053195 A | 9/2014 |
| CN | 105227631 A | 1/2016 |
| CN | 105828345 A | 8/2016 |
| EP | 2175290 A1 | 4/2010 |
| EP | 2175290 B1 | 10/2013 |
| EP | 3029996 A1 | 6/2016 |
| EP | 3139516 A1 | 3/2017 |
| EP | 3101643 B1 * | 5/2018 |
| EP | 3349085 A1 | 7/2018 |
| JP | 2003-092545 A | 3/2003 |
| RU | 2595642 C1 | 8/2016 |
| RU | 2637838 C2 | 12/2017 |
| WO | 2011/100535 A1 | 8/2011 |
| WO | 2012/112097 A1 | 8/2012 |
| WO | 2015/114572 A1 | 8/2015 |
| WO | 2015/179439 A1 | 11/2015 |
| WO | 2016/154949 A1 | 10/2016 |
| WO | 2016/161637 A1 | 10/2016 |
| WO | 2016/164892 A1 | 10/2016 |
| WO | 2016/190793 A1 | 12/2016 |
| WO | 2017/019595 A1 | 2/2017 |
| WO | 2017/042403 A1 | 3/2017 |

(56) References Cited

FOREIGN PATENT DOCUMENTS

| WO | 2017/048363 A1 | 3/2017 |
|---|---|---|
| WO | 2017/149160 A1 | 9/2017 |
| WO | 2018/004681 A1 | 1/2018 |

OTHER PUBLICATIONS

3GPP TS 23.203 V12.6.0, 3rd Generation Partnership Project, Technical Specification Group Services and System Aspects, Policy and charging control architecture, (Release 12), Sep. 2014, 220 pages.

3GPP TS 23.203 V14.2.0, 3rd Generation Partnership Project, Technical Specification Group Services and System Aspects, Policy and charging control architecture, (Release 14), Dec. 2016, 256 pages.

3GPP TS 23.271 V14.0.0, 3rd Generation Partnership Project, Technical Specification Group Services and System Aspects, Functional stage 2 description of Location Services (LCS), (Release 14), Dec. 2016, 180 pages.

3GPP TS 23.401 V14.2.0, 3rd Generation Partnership Project, Technical Specification Group Services and System Aspects, General Packet Radio Service (GPRS) enhancements for Evolved Universal Terrestrial Radio Access Network (E-UTRAN) access, (Release 14), Dec. 2016, 385 pages.

3GPP TS 36.201 V14.0.0, 3rd Generation Partnership Project, Technical Specification Group Radio Access Network, Evolved Universal Terrestrial Radio Access (E-UTRA) LTE physical layer; General description, (Release 14), Sep. 2016, 15 pages.

3GPP Ts 36.300 V14.1.0, 3rd Generation Partnership Project, Technical Specification Group Radio Access Network, Evolved Universal Terrestrial Radio Access (E-UTRA) and Evolved Universal Terrestrial Radio Access Network KE-UTRAN), Overall description, Stage 2, (Release 14), 2016-12, 317 pages.

3GPP TS 45.002 V14.0.0, 3rd Generation Partnership Project, Technical Specification Group Radio Access Network, GSM/EDGE Multiplexing and multiple access on the radio path, (Release 14), Dec. 2016, 142 pages.

Curran et al., "Location Based Predictive Handoff Algorithm for Mobile Networks," Advances in Intelligent IT: Active Media Technology, May 2006, pp. 86-91.

Federal Aviation Administration, Automatic Dependent Surveillance-Broadcast (ADS-B), 2019, 2 pages.

Forsberg, Providing Air Traffic Control Services for Small Unmanned Aircraft Through LTE, https://www.diva-portal.org/smash/get/diva2:1041494/FULLTEXT01.pdf, 2016, 90 pages.

GPS World, "uAvionix demonstrates dime-sized ADS-B for high-traffic drone operations", available online at <http://gpsworld.com/uavionix-demonstrates-dime-sized-ads-b-for-high-traffic-drone-operations>, retrieved on Apr. 4, 2017, 6 pages.

Guterres et al., "ADS-B Surveillance System Performance with Small UAS at Low Altitudes", available online at <https://www.mitre.org/sites/default/files/publications/16-4497-AIAA-2017-ADS-B.pdf>, 2017, 15 pages.

Huawei et al., "Mobility enhancement for Drones", 3GPP TSG-RAN WG2 Meeting #98, R2-1704997, 3rd Generation Partnership Project (3GPP), Hangzhou, China, May 14, 2017 (May 14, 2017), XP051275500, Retrieved from the Internet: URL:http://www.3gpp.org/ftp/Meetings_3GPP_SYNC/RAN2/Docs/.

Huawei et al., "Potential enhancements for drones", 3GPP TSG-RAN WG1 Meeting #89, R1-1707016, 3rd Generation Partnership Project (3GPP), Hangzhou, China, May 14, 2017 (May 14, 2017), XP051272246, Retrieved from the Internet: URL:http://www.3gpp.org/ftp/Meetings_3GPP_SYNC/RAN1/Docs/.

IEEE Std 802.11 (Trademark)—2012, Part 11: Wireless LAN Medium Access Control (MAC) and Physical Layer (PHY) Specifications, Mar. 2012, 2793 pages.

International Preliminary Report on Patentability, PCT App. No. PCT/IB2017/053444, dated Oct. 10, 2019, 9 pages.

International Preliminary Report on Patentability, PCT App. No. PCT/IB2017/053477, dated Oct. 10, 2019, 8 pages.

International Preliminary Report on Patentability, PCT App. No. PCT/IB2017/053641, dated Oct. 10, 2019, 8 pages.

International Preliminary Report on Patentability, PCT App. No. PCT/IB2017/054160, dated Oct. 16, 2019, 21 pages.

International Preliminary Report on Patentability, PCT App. No. PCT/IB2017/054252, dated Oct. 24, 2019, 8 pages.

International Preliminary Report on Patentability, PCT App. No. PCT/IB2017/057810, dated May 9, 2019, 13 pages.

International Preliminary Report on Patentability, PCT App. No. PCT/IB2017/057859, dated Oct. 10, 2019, 15 pages.

International Preliminary Report on Patentability, PCT App. No. PCT/IB2017/057860, dated Oct. 10, 2019, 14 pages.

International Search Report and Written Opinion for Application No. PCT/IB2017/053641, dated Nov. 22, 2017, 11 pages.

International Search Report and Written Opinion for Application No. PCT/IB2017/054160, dated Mar. 13, 2018, 16 pages.

International Search Report and Written Opinion for Application No. PCT/IB2017/054252, dated Jan. 3, 2018, 11 pages.

International Search Report and Written Opinion for Application No. PCT/IB2017/057810, dated Mar. 13, 2018, 10 pages.

International Search Report and Written Opinion for Application No. PCT/IB2017/057859, dated Jun. 12, 2018, 21 pages.

International Search Report and Written Opinion for Application No. PCT/IB2017/057860, dated Jun. 12, 2018, 20 pages.

International Search Report and Written Opinion, PCT App. No. PCT/IB2017/053444, dated Dec. 21, 2017, 13 pages.

International Search Report and Written Opinion, PCT App. No. PCT/IB2017/058525, dated Jul. 30, 2018, 14 pages.

International Search Report and Written Opinion, PCT App. No. PCT/IB2018/052238, dated Dec. 13, 2018, 12 pages.

International Search Report and Written Opinion, PCT App. No. PCT/IB2018/052239, dated Nov. 29, 2018, 13 pages.

International Search Report and Written Opinion, PCT App. No. PCT/US2017/050046, dated Dec. 13, 2017, 13 pages.

Kapellaki et al., "The "Le" interface: performance evaluation of 2-tier and 3-tier 3GPP compliant realizations," IEEE International Conference on Communications, ICC 2005, vol. 3, No. 16, 2005, pp. 1423-1427.

Latas, "The Drone Safety Platform", available online at <http://www.flylatas.com/>, retrieved on Mar. 31, 2017, 7 pages.

LG Electronics Inc., "Aerial Traffic Handling using Positioning Identification", 3GPP TSG-RAN WG2 Meeting #98, *2-1705660, 3rd Generation Partnership Project (3GPP), Hangzhou, China, May 14, 2017 (May 14, 2017), KP051275974, Retrieved from the Internet: URL:http://www.3gpp.org/ftp/Meetings 3GPPSYNC/RAN2/Docs/.

MAVLINK Common Message set specifications, available online at <http://mavlink.org/messages/common>, retrieved on Jan. 31, 2017, 98 pages.

Opensignal, "Opensignal combines real-world measurements with scientific analysis to provide independent insights on mobile connectivity globally", available online at <https://www.opensignal.com/>, 2020, 4 pages.

Orefice, "ADS-B Based Sense and Avoid Applications for General Aviation/Unmanned Aircraft", available online at <http://www.fedoa.unina.it/10305/1/orefice_martina_27.pdf>, 2015, 114 pages.

Qualcomm, LTE Unmanned Aircraft Systems, Qualcomm Technologies, Inc., Trial Report, v1.0.1, May 12, 2017, 65 pages.

R1-1705823, 3GPP TSG-RAN WG1 Meeting 88bis, Spokane, KDDI Corporation, Field measurement results for drone LTE enhancement, USA, Apr. 3-7, 2017, 6 pages.

Radio Control, Beginners' Guide, available online at <https://rcplanes.online/guide1.htm>, May 8, 2019, 9 pages.

Ruano et al., "Augmented Reality Tool for the Situational Awareness Improvement of UAV Operators", Sensors, vol. 17, 2017, 16 pages.

Second Written Opinion for Application No. PCT/IB2017/054160, dated Jun. 7, 2019, 15 pages.

SUR.ET1.ST05.2000-STD-12-01, Eurocontrol Standard Document for Surveillance Data Exchange, Part 12: Category 021, ADS-B Reports, Dec. 2010, 72 pages.

(56) References Cited

OTHER PUBLICATIONS

UAS Identification and Tracking (UAS ID) Aviation Rulemaking Committee (ARC), ARC Recommendations Final Report, Sep. 30, 2017, 213 pages.
UAvionix, "ADS-B Transceivers, Receivers and Navigation Systems for Drones", available online at <http://www.unmannedsystemstechnology.com/company/uavionix-corporation>, retrieved on Apr. 4, 2017, 10 pages.
Unmanned Aircraft System (UAS) Traffic Management (UTM), available online at <https://utm.arc.nasa.gov/index.shtml>, retrieved on Apr. 4, 2017, 2 pages.
Wikipedia, "Blockchain", available online at <https://en.wikipedia.org/w/index.php?title=Blockchain&oldid=901056350>, retrieved on Jun. 9, 2019, 20 pages.
Office Action, TW App No. 107115169, dated Apr. 22, 2019, 9 pages (2 pages of Partial English Translation and 7 pages of Original Document).
Office Action, TW App. No. 107115169, dated Nov. 28, 2018, 17 pages (8 pages of English Translation and 9 pages of Original Document).
International Search Report and Written Opinion for Application No. PCT/IB2017/053477, dated Dec. 15, 2017, 11 pages.

\* cited by examiner

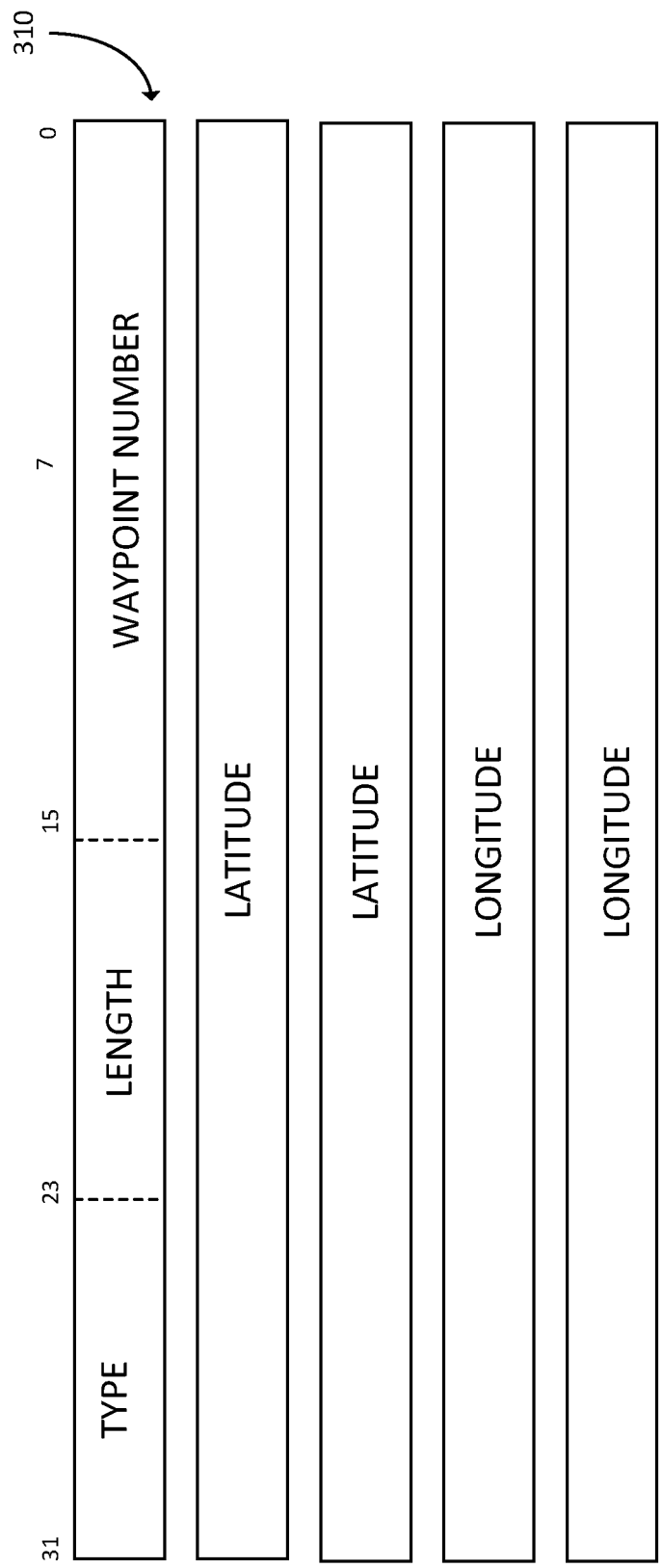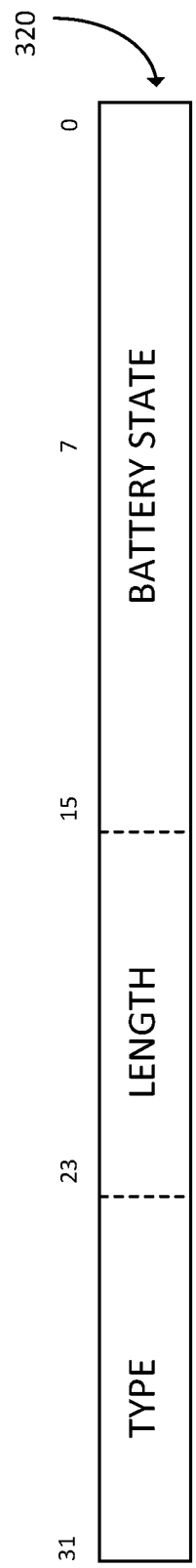
FIG. 4
FIG. 5

BROADCASTING GEOLOCATION INFORMATION IN A RADIO FRAME TRANSMITTED FROM AN UNMANNED AERIAL VEHICLE

CROSS-REFERENCE TO RELATED APPLICATIONS

This application is a national stage of International Application No. PCT/IB2017/053477, filed Jun. 12, 2017, which claims the benefit of U.S. Provisional Application No. 62/480,347, filed Mar. 31, 2017, which are hereby incorporated by reference.

TECHNICAL FIELD

This disclosure relates to the field of managing unmanned aircraft systems and more specifically, to broadcasting geolocation information from an airborne unmanned aerial vehicle to inform the unmanned aerial vehicle's current geolocation to others.

BACKGROUND

Unmanned Aerial Vehicle (UAV), also sometime referred to as a Drone, is a radio controlled or automated aircraft. Typically, UAVs are controlled by the users over analog radio controlled (RC) channel, but today autopilot software (SW) may be utilized in the aircraft to let them fly beyond the line of sight of the human operators. Autonomous UAVs still require connectivity to the network in order for an operator to recall or change the mission the UAV is executing. Typically for such communication the UAVs will be equipped with Mobile Internet interfaces (e.g. 3GPP radio or WiFi). When UAVs are flying autonomously they may require collision avoidance SW to detect and avoid other UAVs, because the UAV's cannot rely on visual aid from human operators. Currently, under the just completed NASA-FAA joint technology capability level 3 (TCL3), there has been no solution proposed for the sense and avoid study group.

Furthermore, the Federal Aviation Administration (FAA) and National Aeronautics and Space Administration (NASA) are defining an Unmanned Aircraft System Traffic Management (UTM) framework. Such a system seeks to present an effective management structure for Unmanned Aircraft System (UAS) traffic. In this vein, the UTM is sought to act as an enabler to promote widespread use of UASs in both commercial and recreational settings while at the same time minimizing the perils to manned air traffic and surrounding pieces of infrastructure.

To meet the above objectives, a UAS Service Supplier (USS) operating within the UTM may receive a set of directives and constraints. The directives and constraints may layout the current state of the managed airspace and may include restricted flight areas or other limitations to a UAS. Upon receiving a proposed UAS mission, the USS will assist in determining whether the mission is authorized to proceed and if so authorized may transmit flight path information along with other relevant information to the UAS operator for operating an Unmanned Aerial Vehicle (UAV).

Automatic Dependent Surveillance-Broadcast (ADS-B) is used in aviation to broadcast aircraft position with Very High Frequency (VHF) to other aircrafts and air traffic control ground stations. Aircraft using ADS-B first determines its position from satellite navigation system and then broadcast this information. Aircrafts also listen on "ADS-B In" service for information about other aircraft.

Presently, UAVs do not have dynamic information about location, altitude, speed and heading of surrounding UAVs. Although ADS-B may be employed for UAVs, there are safety concerns in integrating UTM to ADS-B systems used for commercial aviation. In most cases the traditional aircrafts are occupying different airspaces then UAVs that are meant for low altitude missions. UAVs could be equipped with different radio interfaces for communication, however these technologies do not currently provide a way to broadcast geolocation information. Any centralized or Application Program Interface (API) driven framework is slow and, most likely, would not meet the stringent latency requirements to permit safe operation. Any centralized system may be too slow and would have issues scaling when there are many UAVs in its coverage.

Based on these issues, not only to provide collision avoidance, but to provide a knowledgeable air space for UAV operation, there is a need for knowing where other UAVs are located. One way to achieve this is to provide a way for UAVs to broadcast their respective geolocation, as well as other information, while in flight.

SUMMARY

According to a first aspect of the embodiments described, a method provides for an Unmanned Aerial Vehicle (UAV) to broadcast geolocation information of the UAV by determining, by the UAV, current geolocation of the UAV by communicating with a geolocation service and utilizing the geolocation service to geolocate the UAV. The UAV prepares a radio frame that includes geolocation information identifying the current geolocation of the UAV, wherein the prepared radio frame is for a radio protocol of one of a 3rd Generation Partnership Project (3GPP) radio protocol, a WiFi radio protocol, a wireless personal area network protocol and a low-power wide-area network protocol. The UAV then prepares other information associated with the UAV for inclusion in the radio frame and transmits the radio frame that includes the geolocation information and the other information to broadcast the current geolocation of the UAV.

In another aspect of the embodiments described, an apparatus for use on an UAV that comprises a radio transceiver to transmit and receive radio communication, a processor, and a memory, in which the memory contains instructions, which when the instructions are executed by the processor, cause the apparatus to perform the method for the UAV to broadcast geolocation information of the UAV by determining, by the UAV, current geolocation of the UAV by communicating with a geolocation service and utilizing the geolocation service to geolocate the UAV. The apparatus also prepares a radio frame that includes geolocation information identifying the current geolocation of the UAV, wherein the prepared radio frame is for a radio protocol of one of a 3GPP radio protocol, a WiFi radio protocol, a wireless personal area network protocol and a low-power wide-area network protocol. The apparatus then prepares other information associated with the UAV for inclusion in the radio frame and transmits the radio frame that includes the geolocation information and the other information to broadcast the current geolocation of the UAV.

In another aspect of the embodiments described, a computer-readable storage medium stores instructions which, when executed by a processor, cause an UAV to perform the method of broadcasting the geolocation information and the other information of the UAV as described above.

In another aspect of the embodiments described, a computer program comprising instructions which, when executed by a processor, cause an UAV to perform the method of broadcasting the geolocation information and the other information of the UAV as described above.

In another aspect of the embodiments described, a method provides for rebroadcasting geolocation information of an UAV received at a network node of a wireless communication network by receiving geolocation information and other information associated with the UAV in a radio frame sent in an uplink transmission from the UAV, in which the geolocation information includes information identifying a current geolocation of the UAV. The radio frame is sent using a radio protocol of one of a 3rd Generation Partnership Project (3GPP) radio protocol, a WiFi radio protocol, a wireless personal area network protocol and a low-power wide-area network protocol. The network node processes the received radio frame for broadcast to one or more other UAVs and transmits the information identifying the current geolocation of the UAV as a rebroadcast in a downlink transmission to the one or more other UAVs.

In another aspect of the embodiments described, a network node of a wireless communication network receives and rebroadcast geolocation information of an UAV. The network node comprises a processor and a memory coupled to the processor, in which the memory contains instructions, which when the instructions are executed by the processor, cause the network node to receive geolocation information and other information associated with the UAV in a radio frame sent in an uplink transmission from the UAV, in which the geolocation information includes information identifying a current geolocation of the UAV. The radio frame is sent using a radio protocol of one of a 3rd Generation Partnership Project (3GPP) radio protocol, a WiFi radio protocol, a wireless personal area network protocol and a low-power wide-area network protocol. The network node processes the received radio frame for broadcast to one or more other UAVs and transmits the information identifying the current geolocation of the UAV as a rebroadcast in a downlink transmission to the one or more other UAVs.

In another aspect of the embodiments described, a computer-readable storage medium stores instructions which, when executed by a processor, cause a network node to receive and rebroadcast the geolocation information and the other information of an UAV as described above.

In another aspect of the embodiments described, a computer program comprising instructions which, when executed by a processor, cause a network node to receive and rebroadcast the geolocation information and the other information of an UAV as described above.

Advantage may be derived from the practice of the embodiments described. Currently industry is debating whether to allow ADS-B equipment in UAVs as it may cause problems (e.g. noise and explosion of information) for commercial aircrafts and air traffic control towers. The described embodiments may provide safer way to incorporate to the radio signaling the information learned from ADS-B signaling about occupied air space. The radio equipment used for communication in the lower altitudes will not cause distraction to the air traffic not utilizing these radio frequencies. In addition, air traffic control towers may run algorithms to keep out UAVs from airport area and notify, when necessary, the commercial aircrafts about nearby UAV activity. Furthermore, UAVs may implement distributed local decision logic to do collision avoidance based on the new geolocation information option. UAVs may broadcast internal state information, warnings and errors that may alarm operators to safely land the vehicle or reroute traffic around problem areas. Typical examples of hazards are frequent meteorological events along the flight path. Also, periodically gathering this information allows officials or UTM administrators a view to the history of internal state and route of individual UAVs. A log of the broadcasted information may provide secondary usages—insurance arbitrage data in case of a collision, weather information at a given altitude, traffic and congestion information around an area, movement of parked vehicles for security applications, airspace conformance/compliance information, etc.

BRIEF DESCRIPTION OF THE DRAWINGS

The disclosure may best be understood by referring to the following description and accompanying drawings that are used to illustrate the various embodiments. In the drawings:

FIG. 4 illustrates an example geolocation information for waypoints that is prepared into a radio frame for broadcasting according to one embodiment;

FIG. 5 illustrates an example battery state information that is prepared into a radio frame for broadcasting according to one embodiment;

DETAILED DESCRIPTION

Figure 1:
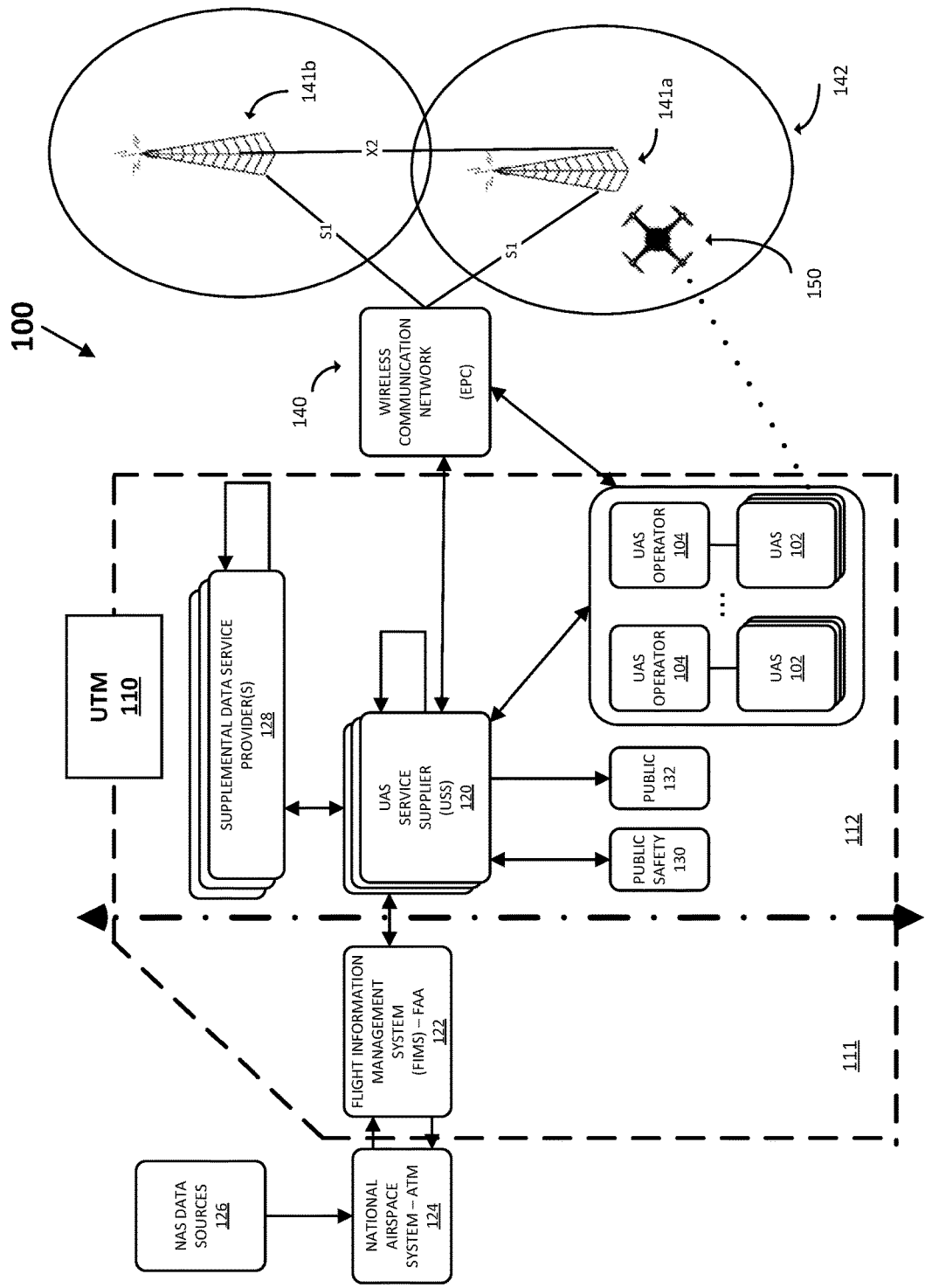
FIG. 1 illustrates an air traffic system, a wireless communication network and an Unmanned Aerial Vehicle (UAV) that operates within the system and the network according to one embodiment.

In the following description, numerous specific details are set forth. However, it is understood that the disclosed embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

Bracketed text and blocks with dashed borders are used herein to illustrate operations and features of the described embodiments. However, such notation, as well as blocks with solid borders, are not necessarily required, or may be optional, in certain embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Furthermore, the term "broadcast" is used herein to describe the transmission of a radio frame to multiple targets. However, the techniques described for the "broadcast" are applicable as "multi-cast" transmission or to "unicast" transmission directed to one target entity as well.

Reference in the specification to a processor or processing device may be a microprocessor, controller, microcontroller, central processing unit, digital signal processor, application specific integrated circuit, field programmable gate array, any other type of electronic circuitry, or any combination of one or more of the preceding. The processor may comprise one or more processor cores. In some embodiments, some or all of the functionality described herein may be implemented by a processor executing instructions of a computer program, which may be stored in a memory, a computer-readable storage medium or other devices.

A memory referenced in the specification may store code (which is composed of software instructions and which is sometimes referred to as computer program code or a computer program) and/or data using non-transitory machine-readable (e.g., computer-readable) media, such as machine-readable storage media (e.g., magnetic disks, optical disks, solid state drives, read only memory (ROM), flash memory devices, phase change memory) and machine-readable transmission media (e.g., electrical, optical, radio, acoustical or other form of propagated signals—such as carrier waves, infrared signals). For instance, the memory may comprise non-volatile memory containing code to be executed by a processor. Where the memory is non-volatile, the code and/or data stored therein can persist even when the network device is turned off (when power is removed). In some instances, while a network device is turned on that part of the code that is to be executed by the processor(s) may be copied from non-volatile memory into volatile memory (e.g., dynamic random access memory (DRAM), static random access memory (SRAM)) of a network device.

An Interface, as described in the specification, may be used in the wired and/or wireless communication of signaling and/or data to or from a network device. For example, an interface may perform any formatting, coding, or translating to allow a network device to send and receive data whether over a wired and/or a wireless connection. In some embodiments, an interface may comprise radio circuitry capable of receiving data from other devices in the network over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, an interface may comprise network interface controller(s) (NICs), also known as a network interface card, network adapter, local area network (LAN) adapter or physical network interface. The NIC(s) may facilitate in connecting the network device to other devices allowing them to communicate via wire through plugging in a cable to a physical port connected to a NIC. In some embodiments, a processor may represent part of an interface, and some or all of the functionality described as being provided by an interface may be provided more specifically by the processor.

The components of a network device, as depicted in the drawings are each depicted as separate boxes located within a single larger box for reasons of simplicity in describing certain aspects and features of a network device. In practice, one or more of the components illustrated may comprise multiple different physical elements (e.g., an interface may comprise terminals for coupling wires for a wired connection and a radio transceiver for a wireless connection).

While the modules described may be illustrated as being implemented in software stored in memory, other embodiments may implement part or all of each of these modules in hardware.

The description below describes a UAV using a control frame or frames, or control channel, to broadcast the geolocation information of the UAV. However, it is to be understood that data may be placed in a payload portion of a frame as well and is not limited to control frames for transmitting the geolocation information and/or other information. Furthermore, the description recites the broadcast of geolocation information and/or other information in a frame, but such broadcasts may occur using more than one frame.

FIG. 1 shows an air traffic system 100 according to one embodiment. The air traffic system 100 includes an Unmanned Aircraft System (UAS) Traffic Management (UTM) system 110, that has a government component 111 and an industry component 112. The government component 111 is developed and deployed by one or more government agencies, such as the Federal Aviation Agency (FAA) and includes a flight Information Management System (FIMS) 122. The FIMS 122 communicates with the Air Traffic Management (ATM) 124 of the National Airspace System (NAS), which can obtain information from the NAS data sources 126.

The industry component 112 is developed and deployed primarily by one or more players in the industry and includes one or more UAS Service Supplier (USS) 120 that communicates with the UAS operators 104. USS 120 may have access to one or more Supplemental Data Service Providers 128. USS 120 may also have access to, as well as access by, one or more Public Entity 132 and/or Public Safety Entity 130.

A purpose of UTM 110 is for managing the flights of one or more UASs 102 that are controlled/operated/piloted by corresponding UAS operators 104. UASs 102 may be small or miniature UASs, which are unmanned aircraft that are small enough to be considered portable by an average person and typically operate/cruise at altitudes lower than larger manned aircraft. For example, a small UAV may be any unmanned aircraft that is small and/or is designed to operate below a certain altitude (e.g. 1,000 feet or even below 500 feet). Although the embodiments described herein may be applied to small UAVs, the systems and methods are not restricted to aircraft of these sizes or that are designed to operate at particular altitudes. Instead, the methods and systems described herein may be similarly applied to aircraft of any size or design. UASs 102 may be interchangeably referred to as UAVs or drones throughout this description. In particular, one airborne UAV 150 is illustrated in FIG. 1.

UASs 102 are aircraft without an onboard human controller. Instead, UASs 102 may be operated/piloted using various degrees of autonomy. For example, a UAS 102 may be operated by a human (i.e., the UAS operator 104) located on the ground or otherwise removed and independent of the location of the UAS 102. For example, a UAS operator 104 may be located on the ground and acts to directly control each movement of a UAS 102 or a group of UASs 102 through a radio control interface (e.g., a command and control (C2) interface). UAS operator 104 may transmit commands via the radio interface to cause a particular UAS 102 to adjust/move particular flight instruments (i.e., flaps, blades, motors, etc.) for the purpose of following a flight plan or another set of objectives. In other scenarios, the UAS operator 104 may provide a flight plan that is approved by USS 120 to UAS 102 for autonomous operation by the particular UAS 102. A human operator may monitor the progress of the flight plan without piloting the UAS 102 and intervene as needed or as directed by USS 120.

As illustrated in FIG. 1, one UAS 102 is shown as UAV 150 operating within an airspace having radio communication coverage by a wireless communication network 140. Wireless communication network 140 may be any one of a variety of communication network(s) that provides a wireless communication link with the UAV. Network 140 may be, or include, a Radio Access Network (RAN) in some embodiments. Network 140 may operate utilizing one or more communication protocols. Thus, network 140 may operate utilizing radio communication protocols based on a 3rd Generation Partnership Project (3GPP), such as third generation (3G), fourth generation (4G), 4G Long Term Evolution (LTE), fifth generation (5G), 5G New Radio (e.g. NR and NX); WiFi (e.g. Institute of Electrical and Electronics Engineers (IEEE) 802.11 protocols); wireless personal area network (e.g. IEEE 802.15.4 protocols); Internet of Things (IoT); and low-power wide area network radio communication. Other communication protocols and standards may be used in implementing network 140.

Wireless communication network 140 typically includes a plurality of radio network access devices 141 (two are shown as 141a and 141b), which are called by various names depending on the communication protocol and/or standard employed. Thus, radio network access device(s) 141 may be a base station (BS), access point (AP), NodeB (NB) in 3G, evolved NodeB (eNB) in LTE, Base Station Controller (BSC), or Radio Network Controller (RNC). Other nomenclatures may apply. Generally, radio network access device 141 allows a mobile device to communicate with the wireless communication network over its coverage area. The example shown in FIG. 1 is a 4G LTE system, where eNBs communicate with an Evolved Packet Core (EPC) of the network 140 over a S1 interface and eNB-to-eNB communication over the X2 interface.

In the illustrated example of FIG. 1, UAV 150 is operating within coverage area of radio network access device 141a. In a typical scenario, UAV 150, upon entering the coverage area 142 of radio network access device 141a, operates similar to a UE and establishes a communication link with radio network access devices 141a. The link with communication network 140 allows a communication link back to the UTM 110, either to UAS operator 104 or USS 120, or both. However, other UAVs in the area, such as coverage area 142, do not know the physical geolocation of UAV 150.

Figure 2:
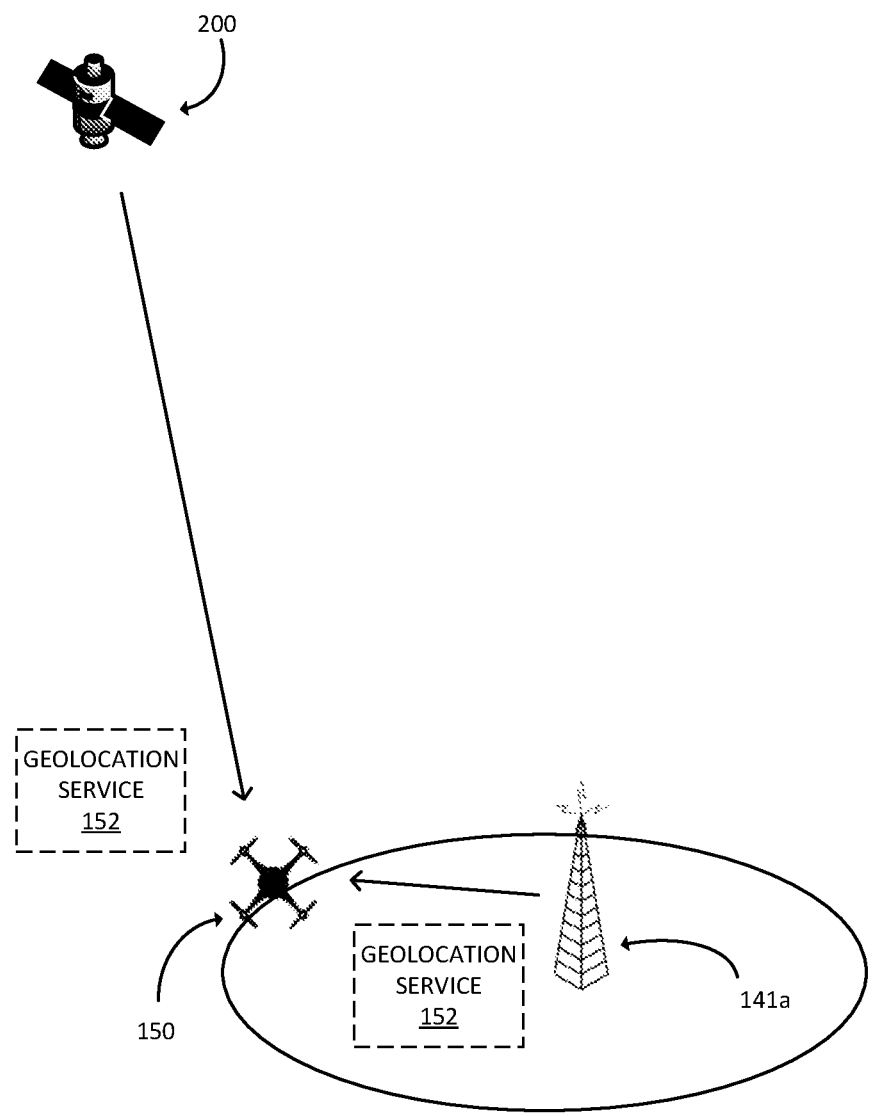
FIG. 2 illustrates an example technique for determining current geolocation information by an UAV according to one embodiment.

FIG. 2 illustrates how UAV 150 may acquire geolocation information of the UAV 150 during flight. UAV 150 determines geolocation information of the UAV 150 using a geolocation service 152. The geolocation service 152 may be included on the UAV 150 in some embodiments. In other embodiments, the geolocation service 152 includes a client component on the UAV 150 and a server component located on a device remote to the UAV 150. The geolocation service 152 may be included on the UAV 150 and may obtain geolocation information by utilizing the Global Positioning System (GPS) provided by satellite services. For instance, UAV 150 may include a GPS receiver that receives information from GPS satellites 200 and can calculate the geolocation information of the UAV 150 based on this information.

The geolocation service 152 may have a client component located on the UAV 150 and a server component located on a device remote to the UAV 150 and may obtain geolocation information by communicating with the communication network 140 to determine the position of the UAV 150 relative to a radio network access device communicating with the UAV over the communication network 140. For instance, the geolocation information of the UAV 150 may be determined based on radio signal measurements of the UAV 150 and estimating the geolocation information (such as the position) based on those radio signal measurements (e.g., based on triangulation of the radio signal measurements). In such a case, the geolocation information is network determined and received by the UAV 150, as opposed to being directly determined by the UAV 150 itself. In such a case, the client component of the geolocation service 152 may request and/or receive the geolocation information from a device remote to the UAV 150 (e.g., a server that is part of the communication network 140) via radio network access device 141. Thus, by communicating with a geolocation service 152, UAV 150 uses the service to determine its geolocation.

In determining the current geolocation, UAV 150 either obtains from the geolocation service, or maps, the latitude and longitude (x-y direction) of its current location. Since UAV 150 is capable of having altitude (z-direction), it also determines the current altitude, either by the service or on its own. For example, barometric sensing or other techniques may be used to determine altitude. Furthermore, UAV 150 may also determine its velocity. This may be determined from the change in the geolocation from one reading to the next per unit time, or may be obtained from sensors present on UAV 150. Additionally, UAV 150 may also determine its direction of flight (either x-y only or x-y-z directions).

Once UAV 150 determines its geolocation, as well as other information, UAV 150 then processes the geolocation information for broadcast to inform others of its current geolocation. One intended target for the broadcast is to one or more other UAVs in the vicinity of UAV 150. In order to provide the broadcast, UAV 150 prepares geolocation information identifying the current geolocation in a radio frame format. In one embodiment, the geolocation information is sent as part of a communication control frame or frames from UAV 150 to broadcast the current geolocation of UAV 150.

The broadcast of the radio frame from UAV 150 will depend on the communication protocol being utilized. In an embodiment, the radio communication protocol may be one of a 3GPP radio (e.g., 3G, 4G, 5G, Narrow Band IoT (NB-IoT)), WiFi, wireless personal area network (e.g., IEEE 802.15.4 Xbee/Zigbee, LoRa, Sigfox, Bluetooth) and low-power wide-area network (LPWAN). Accordingly, the geolocation information may be inserted or appended to an existing radio frame or sequence of radio frames. Alternatively, the geolocation information may be sent in a separate radio frame(s). Still where protocols utilize control channels (such as LTE), the geolocation information may be sent as part of the control channel. Still, where a dedicated control channel is implemented to provide location information, the geolocation information can be sent in the dedicated control channel for providing such broadcasts.

Again, depending on the protocol being used, the geolocation information may be sent in a header, a beacon or a probe, in a control channel that communicates with a base station or an access point. For example, the geolocation information may be sent in a Packet Broadcast Control Channel (PBCCH) when communicating with the radio network access device, such as a base station or an access point.

Figure 3:
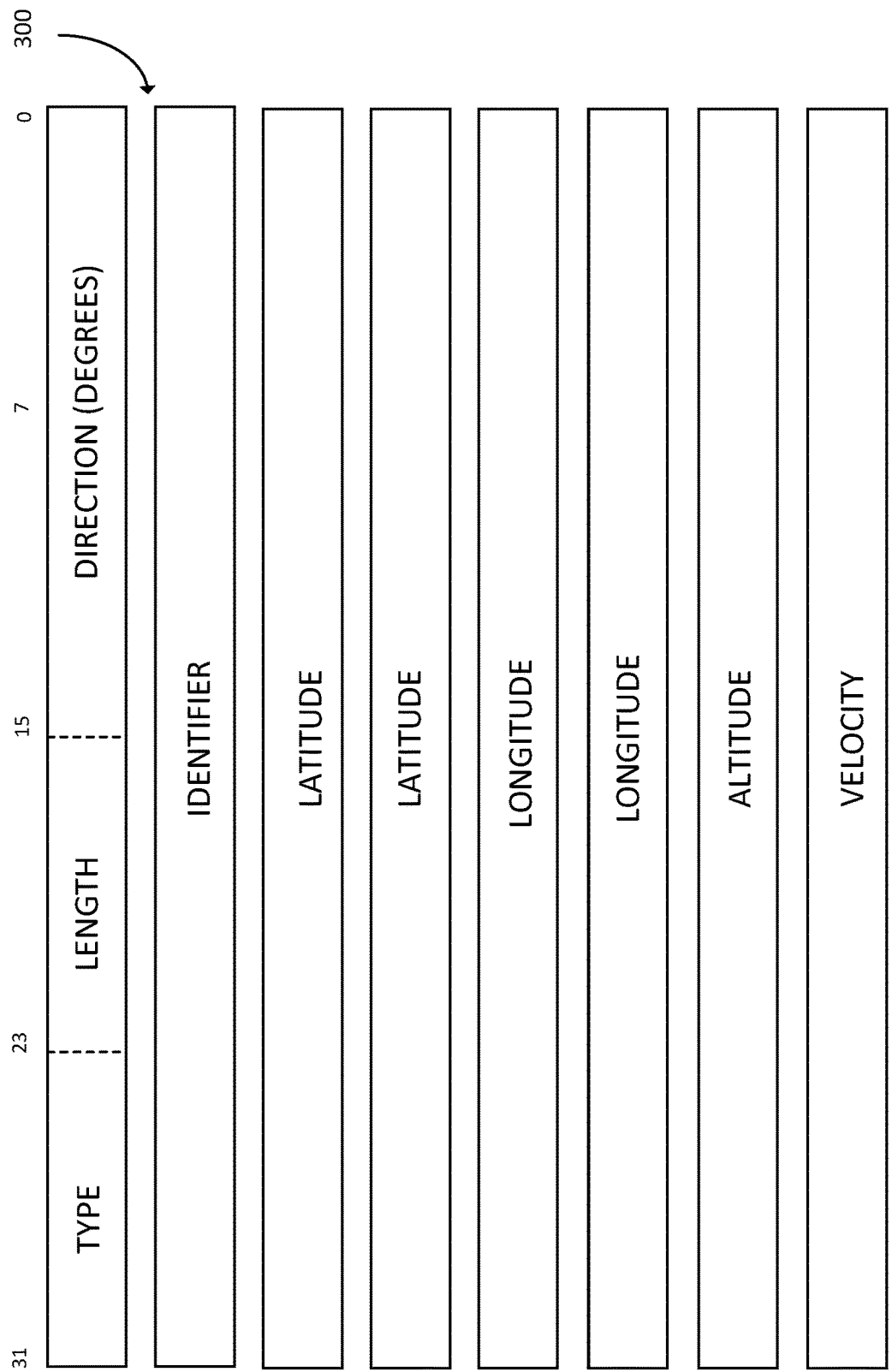
FIG. 3 illustrates an example geolocation information for a UAV that is prepared into a radio frame for broadcasting according to one embodiment.

FIGS. 3-9 illustrate various examples of preparing information into a radio frame format that includes geolocation information, as well as other information for inclusion in a the radio frame. The formats show a 32-bit word field that may be used to contain information and in which one or more 32-bit word(s) is/are used to contain the information that are to be transmitted. The examples are for illustrative purpose and other embodiments may have other formats. FIG. 3 shows format 300 having a length of 8 words, where the entries provide the geolocation of the UAV with the following information:

Type 8 bit field to indicate the type of information being provided

Length 8 bit field to indicate the length of the information being provided

Direction 16 bit field to indicate the direction of movement (e.g. in degrees 0 . . . 360)

Identifier 32 bit field as an identifier of the UAV or radio network equipment

Latitude 64 bit field to indicate the current latitude of the UAV

Longitude 64 bit field to indicate the current longitude of the UAV

Altitude 32 bit field to indicate the altitude of the UAV

Velocity 32 bit field to indicate the velocity of the UAV

Note that the velocity may be provided as part of the geolocation information in some embodiment, but in others, velocity may not be included. Similarly, some embodiments may include the direction information, while others may not do so.

FIG. 4 shows format 310 having a length of 5 words, where the entries provide the following information:

Type 8 bit field to indicate the type of information being provided

Length 8 bit field to indicate the length of the information being provided

Waypoint number 16 bit field to provide an index number of the path waypoint

Latitude 64 bit field to indicate the intended path waypoint latitude

Longitude 64 bit field to indicate the intended path waypoint longitude

The waypoint information provides certain waypoint(s) in the flight of UAV 150, so that others that receive this information may utilize the waypoint(s) to determine the flight path of UAV 150. A plurality of waypoints may be provided, in which each waypoint is given a different index number with corresponding latitude and longitude coordinates along the intended flight path. Format 310 may be sent as other information together with the geolocation information shown in format 300, or may be sent separately.

FIG. 5 shows format 320 having a length of one word, where the entries provide the following information:

Type 8 bit field to indicate the type of information being provided

Length 8 bit field to indicate the length of the information being provided

Battery state 16 bit field to indicate the battery level

Format 320 may be sent as other information together with the geolocation information shown in format 300, or may be sent separately.

Figure 6:
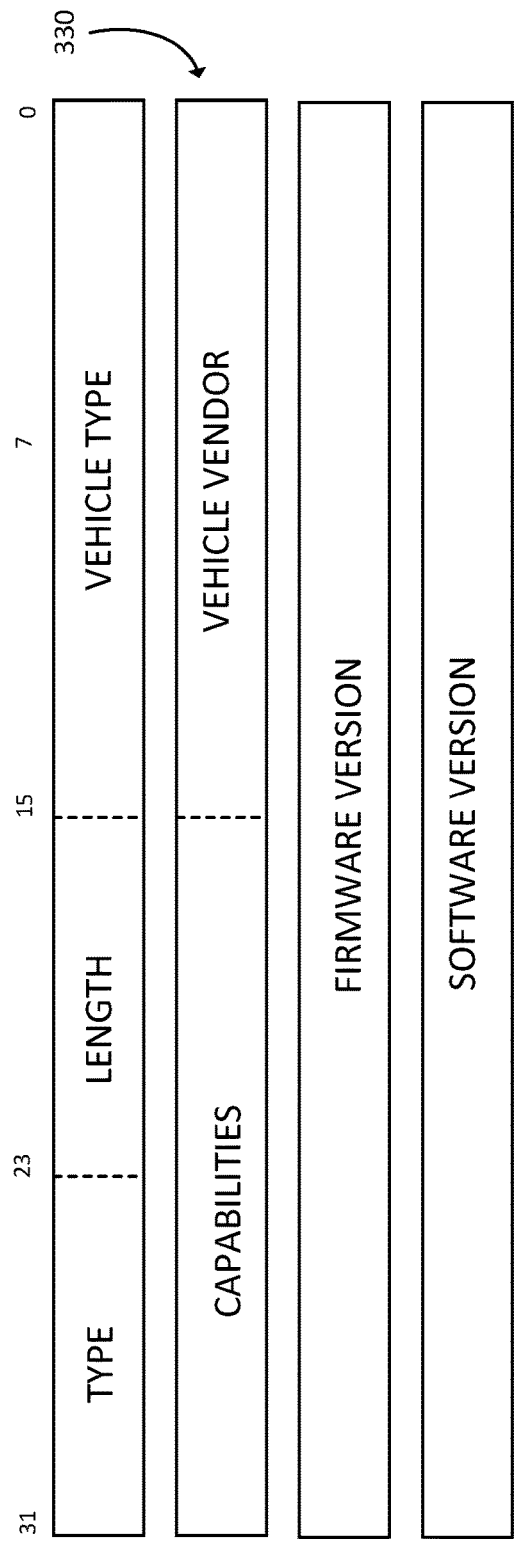
FIG. 6 illustrates an example status information that is prepared into a radio frame for broadcasting according to one embodiment.

FIG. 6 shows format 330 having a length of four words, where the entries provide the following information:

Type 8 bit field to indicate the type of information being provided

Length 8 bit field to indicate the length of the information being provided

Vehicle type 16 bit field to indicate the type of the UAV

Capabilities 16 bit field to indicate the capabilities of the UAV

Vehicle vendor 16 bit field to indicate the vendor of the UAV or flight controller FW version 32 bit field to indicate the Firmware version being utilized SW version 32 bit field to indicate the Software version being utilized Format 330 may be sent as other information together with the geolocation information shown in format 300, or may be sent separately.

Figure 7:
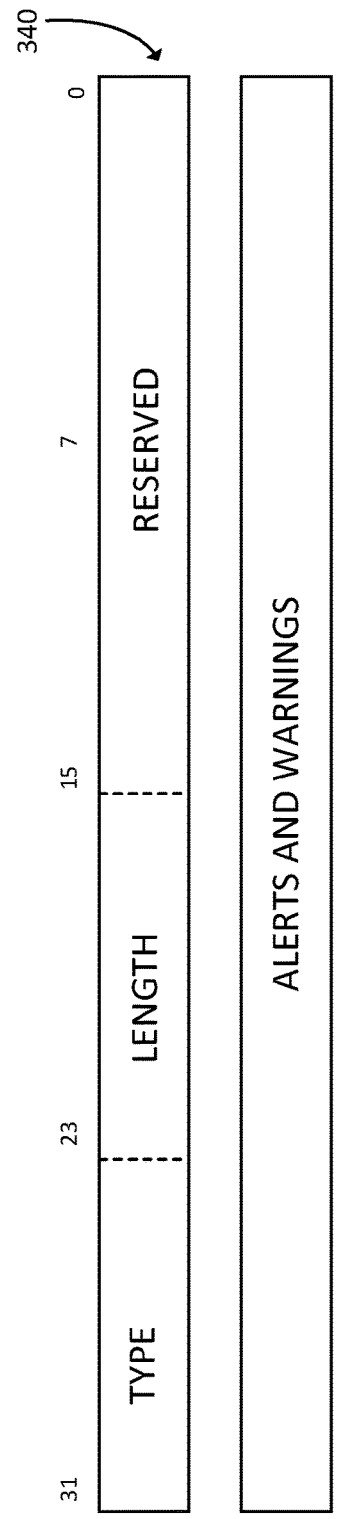
FIG. 7 illustrates an example alerts and warnings information that is prepared into a radio frame for broadcasting according to one embodiment.

FIG. 7 shows format 340 having a length of two words, where the entries provide the following information:

Type 8 bit field to indicate the type of information being provided

Length 8 bit field to indicate the length of the information being provided

Reserved 16 bits for other use

Warnings and alerts Variable length field for encoding alerts and warnings

Format 340 may be sent as other information together with the geolocation information shown in format 300, or may be sent separately.

Figure 8:
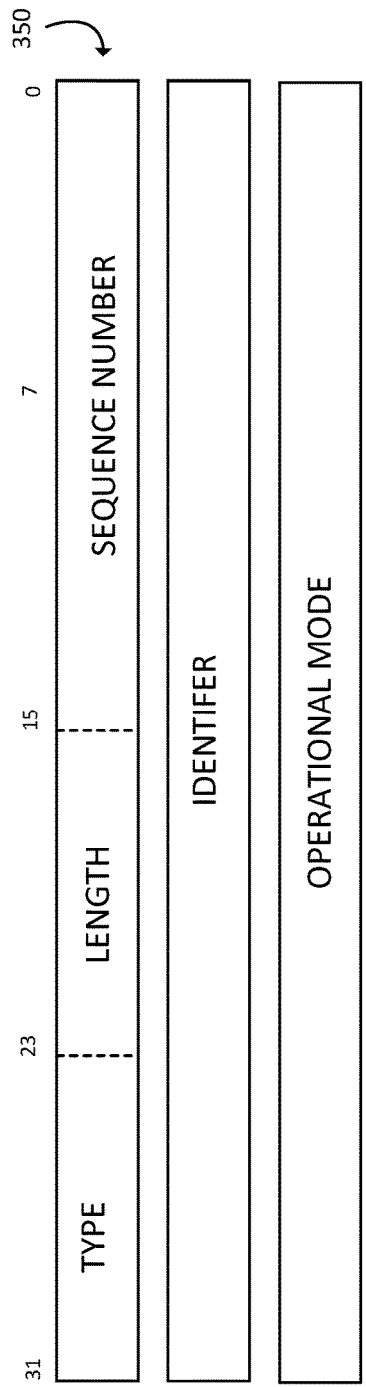
FIG. 8 illustrates an example operational mode information for a UAV that is prepared into a radio frame for broadcasting according to one embodiment.

FIG. 8 shows format 350 having a length of three words, where the entries provide the following information:

Type 8 bit field to indicate the type of information being provided

Length 8 bit field to indicate the length of the information being provided

Sequence Number 16 bit field to indicate the sequence number

Identifier 32 bit field as an identifier of the UAV or radio network equipment

Operation Mode 32 bit field to provide information about the current flight mode The operation mode may provide information about the current flight mode of the UAV, which can be for example:

manual piloting, autonomous operation. Format 350 can also carry more specific information about the flight sequence (sequence number) for example: landing, take-off, transit, loiter.

Format 350 may be sent as other information together with the geolocation information shown in format 300, or may be sent separately.

Figure 9:
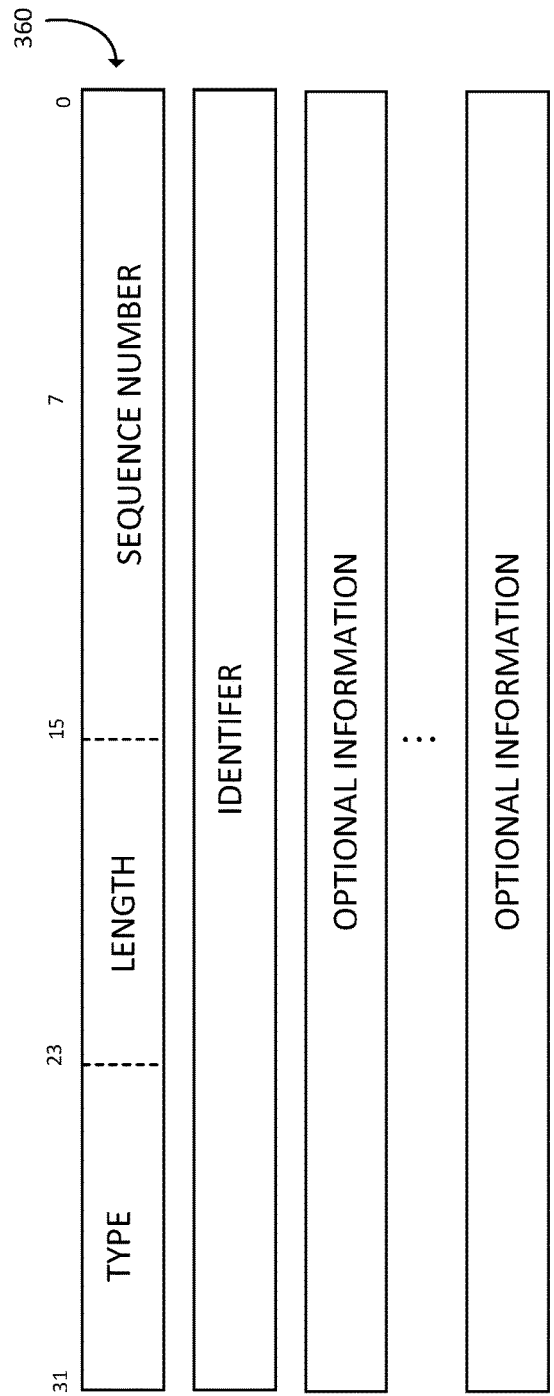
FIG. 9 illustrates an example optional information for a UAV that is prepared into a radio frame for broadcasting according to one embodiment.

FIG. 9 shows format 360 having a length of N words, where the entries provide the following information:

Type 8 bit field to indicate the type of information being provided

Length 8 bit field to indicate the length of the information being provided

Sequence Number 16 bit field to indicate the sequence number

Optional Information Variety of optional information to be sent

The Optional Information format allows various other information to be sent from the UAV. The number of words to be used can be adjusted based on the length of the information that is to be sent. Format 360 may be sent as other information together with the geolocation information shown in format 300, or may be sent separately.

It is to be noted that the various formats presented are provided as examples. Other embodiments may utilize different formats. As noted, the information provided in formats 310, 320, 330, 340, 350 and 360 may be sent as other information with the geolocation information of format 300 in a radio frame, or may be sent in a separate broadcast from UAV 150. Also, the identifier as shown in the figures, or other equivalent information, is typically sent with the radio frames (or associated with the radio frames) to identify the UAV as the source of the transmission. In some situations, the identifier may be made mandatory to identify the messages originated by the UAV.

Figure 10:
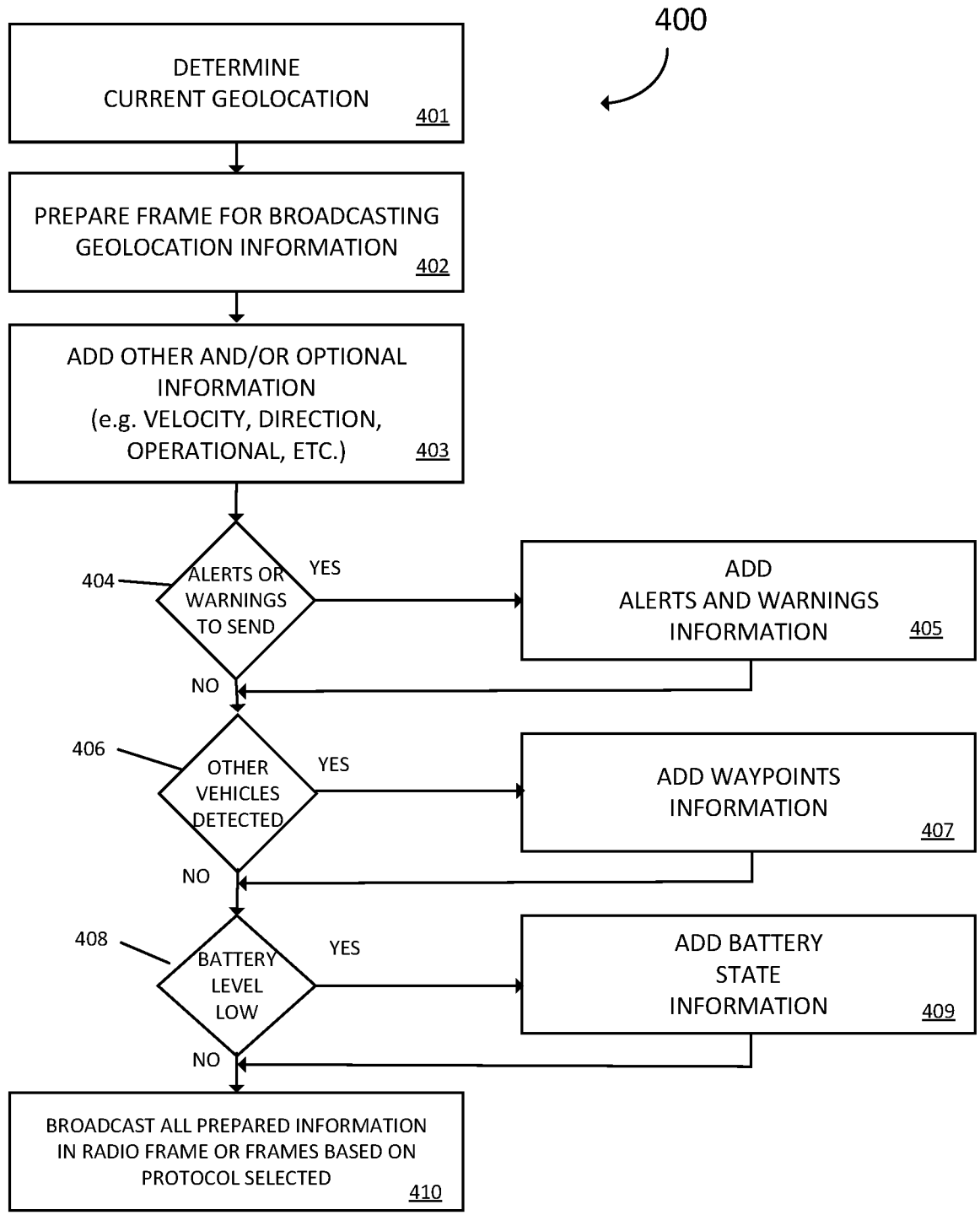
FIG. 10 illustrates a method for preparing information for broadcasting from a UAV according to one embodiment.

FIG. 10 illustrates one embodiment of a method for a UAV broadcasting geolocation information of the UAV using a radio frame or frames for transmission to broadcast the various afore-described information. The method is illustrated in a flow chart 400.

The UAV determines the current geolocation of the UAV by communicating with a geolocation service and utilizing the geolocation service to geolocate the UAV (block 401). For instance, in a case where the UAV includes a GPS receiver, the UAV may determine its current geolocation through use of the GPS receiver. Alternatively or additionally, the UAV may determine its current geolocation by receiving the geolocation information from a communication network as previously described.

The UAV prepares a radio frame that includes geolocation information that identifies the current geolocation of the UAV (block 402). The selection of the radio frame(s) and format may be based on the protocol being utilized (block 402).

If other information is to be sent (e.g. velocity, direction) and/or optional information is to be sent, appropriate information is also prepared for broadcasting (block 403). Then, if alerts or warnings are noted (block 404), then the alerts and warning information is prepared (block 405). If other vehicles (e.g. UAVs) are detected (block 406), then the waypoints information is prepared (block 407). If battery charge level is low (block 408), then the battery status information is prepared (block 409). Finally, once all the information are collected and put into respective format, the information is transmitted in radio frames or frames based on the protocol selected (block 410). As noted, in some embodiments, the radio frames are control frames or frames of a control channel. Other embodiments may send the frames as payload (e.g. data). In some embodiments, functional features of blocks 404, 406 and 408 may be optional, or not even employed.

When UAV 150 broadcasts its geolocation, the UAV 150 broadcasts its geolocation for others in the vicinity, such as the coverage area of the radio network access device. In order to broadcast the information, UAV 150 may do so via the radio network access device or directly to other vehicles in a peer-to-peer transmission.

In one embodiment, UAV 150 transmits the radio frame to the radio network access device and the radio network access device broadcasts the UAV's information to other vehicles in its coverage area. In some embodiments, radio network access device described herein is a RAN. The transmission by the radio network access device may be a relay transmission or the radio network access device may generate its own information package regarding UAV 150 or multiple UAVs in the coverage area. Either way, the information sent from UAV 150 to the radio network access device is then transmitted in a broadcast to other aerial vehicles that are in communication with the radio network access device and/or the network.

As an example of transmitting the geolocation information in a radio frame between a UAV and a radio network access device, such as eNB for LTE operation, the information may be included in a Packet Broadcast Control Channel (PBCCH).

In another embodiment, the broadcast may be between UAVs where peer-to-peer communication is used. The radio network access device sets the framework for two or more UAVs to establish communication with each other via a sidelink communication channel, similar to how UEs utilize sidelink communication. For example, UAV 150 may use a Physical Sidelink Broadcast Channel (PSBCH) to broadcast the information to one or more UAVs in the coverage area.

UAV 150, not only has the capability to broadcast geolocation and other information, but it also has the ability to receive broadcasts of other UAVs, directly via peer-to-peer communication and/or via a radio network access device. Thus, geolocation information of another UAV when received may be used by UAV 150. For example, UAV 150 may relay the received broadcast by retransmitting the information of the other UAV. In one embodiment, information of the other UAV may be sent as optional information portion when preparing the radio frame. This technique allows UAV 150 to extend the operational area for the broadcasting UAV in physical distance. In another technique, UAV 150 may have the capability to operate using multiple protocols. In this embodiment, UAV 150 may receive the other UAV's broadcast using one communication protocol and retransmit the broadcast using another protocol. In one embodiment, the retransmission of the information may be sent as optional information. When UAVs using different protocols are operating in the same area, this scenario allows one UAV to rebroadcast its geolocation information using a second communication protocol, so that the broadcast is captured by UAVs using a different protocol from that used by the original broadcasting UAV. In another example, a UAV may receive information from another entity, such as location information from ADS-B, if it has that capability. It then can broadcast its geolocation using another protocol, such as LTE or WiFi, etc., to inform other UAVs which do not have the ADS-B capability.

One advantage of transmitting current geolocation information to other UAVs in the vicinity is that the other UAVs can process the information for collision avoidance. Thus, when UAV 150 receives a geolocation broadcast from another UAV, UAV 150 may process the information to determine if a potential collision is imminent. Information received pertaining to altitude, velocity and direction of travel broadcast from the other UAV may be utilized by UAV 150 to determine the course of the potential collision with the other UAV. Here, waypoint information received may provide additional information on the intended flight path of the other UAV.

Figure 11:
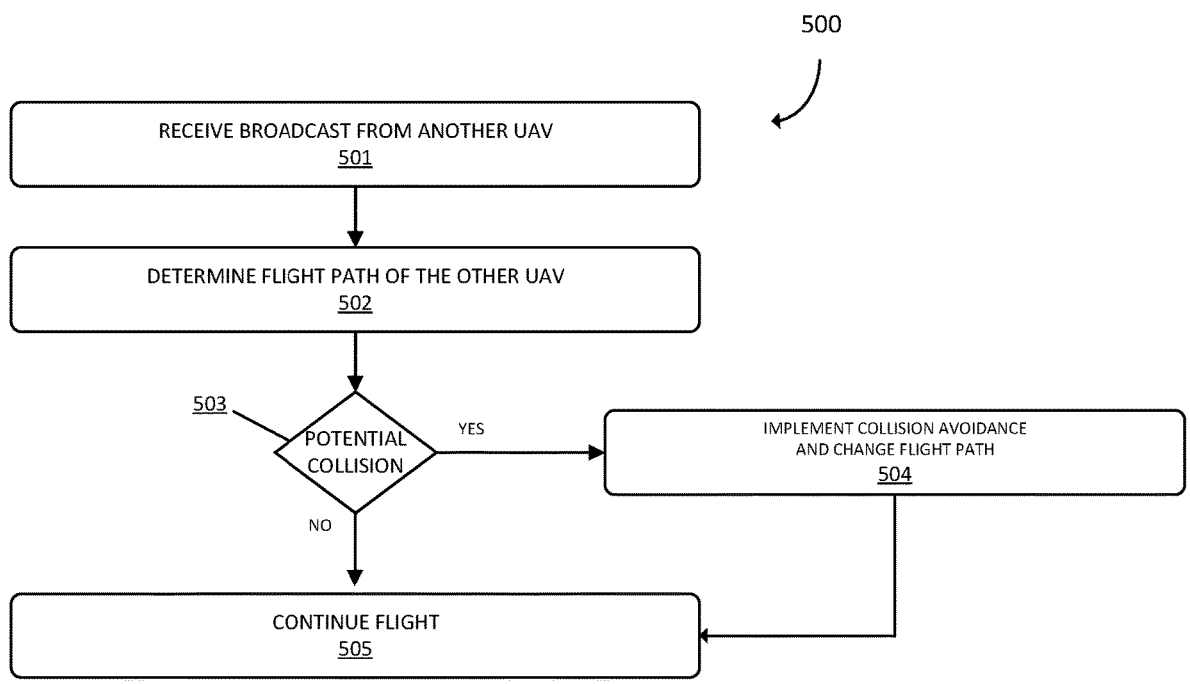
FIG. 11 illustrates a method for using received geolocation information broadcast from another UAV to assess for collision avoidance according to one embodiment.
Figure 12:
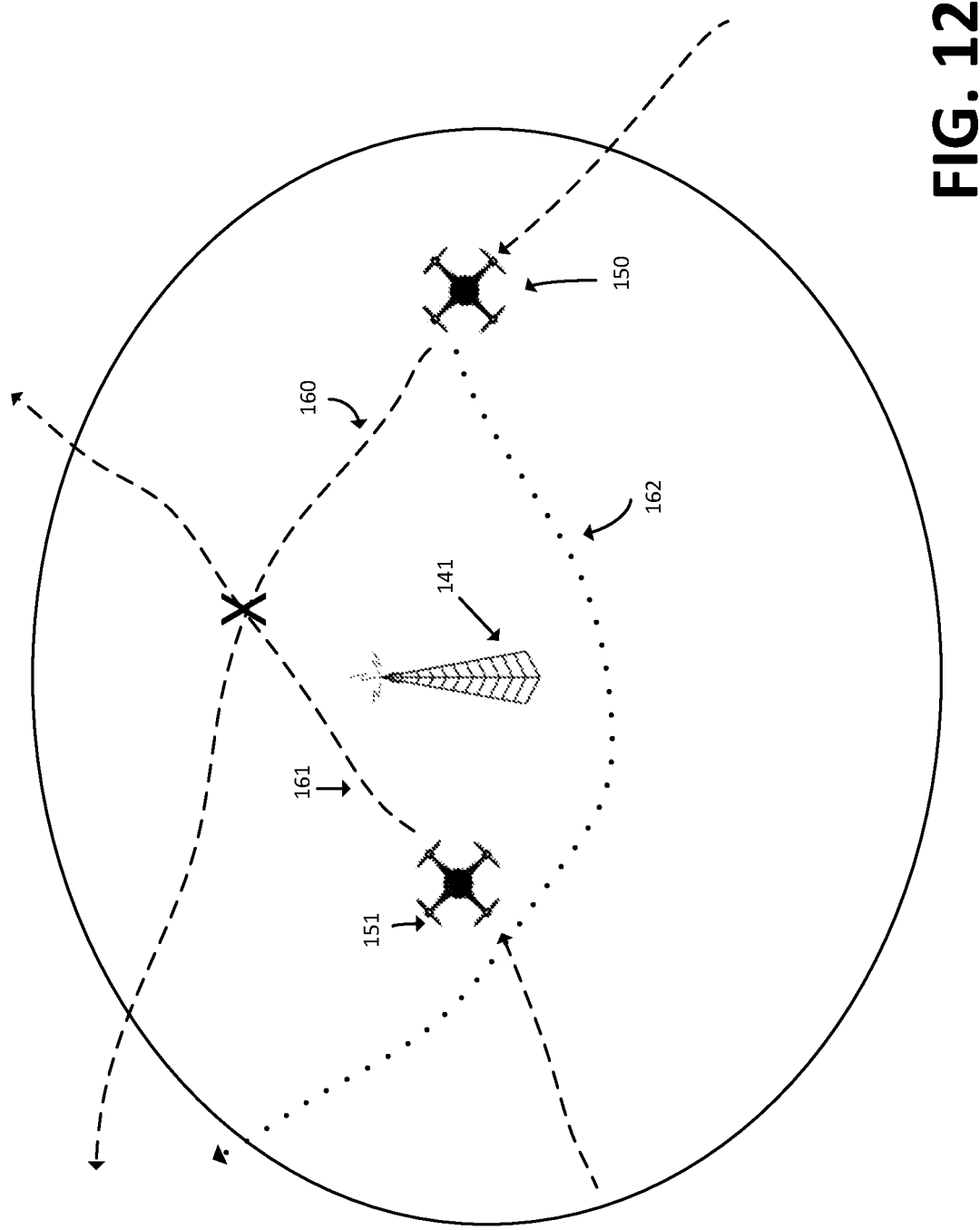
FIG. 12 illustrates a collision avoidance by use of broadcasted geolocation information according to one embodiment.

Referring to FIGS. 11 and 12, FIG. 11 shows one embodiment of a method for providing collision avoidance in flow chart 500. FIG. 12 illustrates the collision avoidance. UAV 150 on its flight path 160 receives broadcast from another UAV 151 (block 501) and determines a flight path 161 of the another UAV 151 from the received broadcast (block 502). Then, with the potential flight path determined, a determination is made as to a potential collision with the other UAV 151 (block 503). If a collision is imminent, UAV 150 implements collision avoidance and changes the flight path (block 504) to flight path 162, and then, UAV 150 continues its flight to the intended destination (block 505). If the UAV 150 determines that a collision is not imminent (block 503), the UAV 150 continues its flight to the intended destination (block 505) on the original flight path 160.

Figure 13:
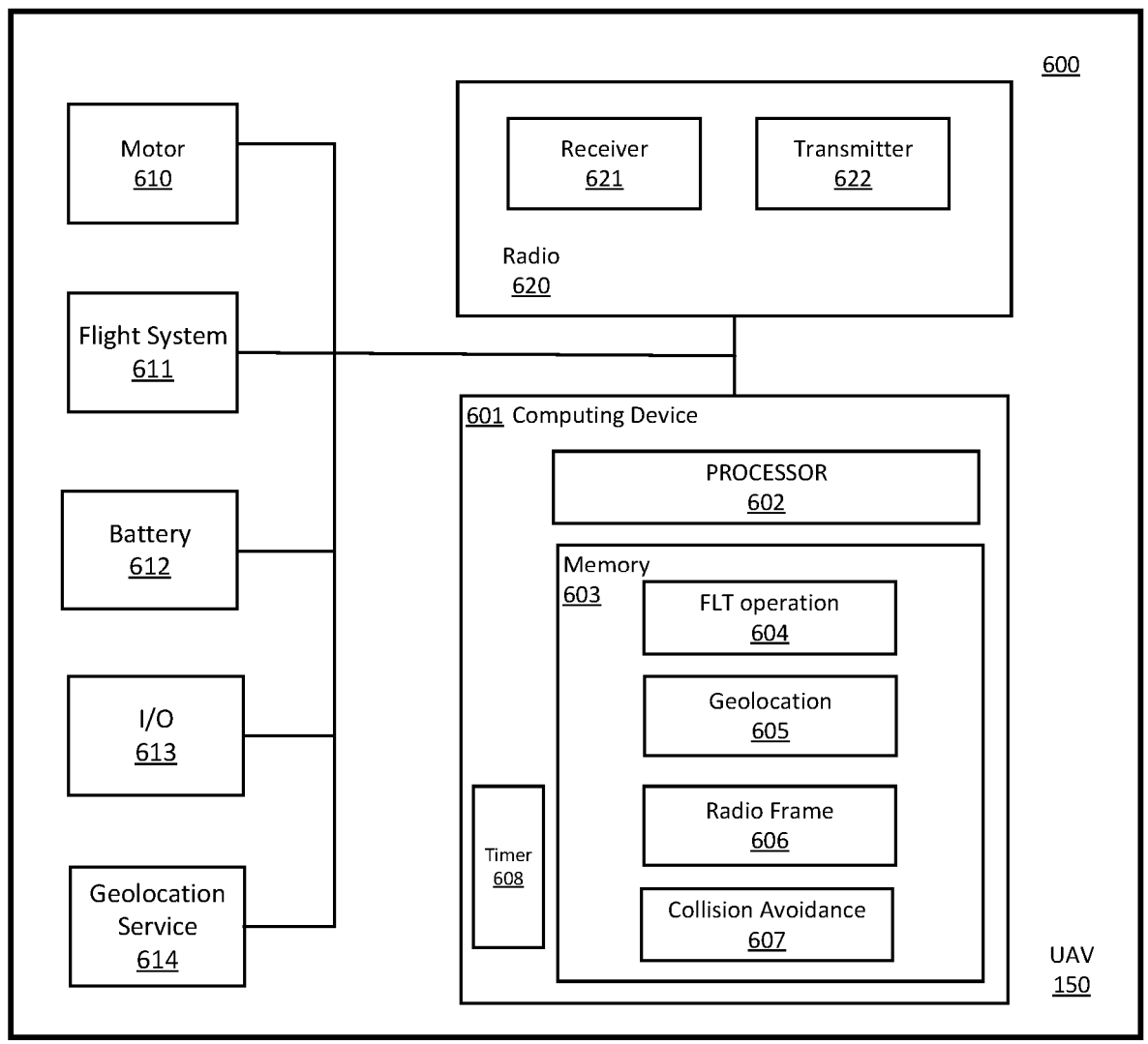
FIG. 13 illustrates components of a UAV according to one embodiment.

FIG. 13 shows a block diagram of a UAV 150 according to one example embodiment. As shown in FIG. 13, an apparatus 600 of UAV 150 may include one or more set of motors 610 with respective motor controllers, which control the speed of rotation of the motors. For example, the motor(s) 610 may be electrical motors that operate off of a battery 612. UAV 150 may include any number of motors 610 that are placed in any configuration relative to the body and/or an expected heading of the UAV. For example, the motors 610 may be configured such that the UAV 150 is a multirotor helicopter (e.g., a quadcopter). In other embodiments, the motors 610 may be configured such that the UAV is a fixed wing aircraft (e.g., a single engine or dual engine airplane). In these embodiments, the motor(s) 610, in conjunction with a flight system 611 keep the UAV 150 in flight and/or propel the UAV in a desired direction. Also included are a battery 612 and one or more Input/Output (I/O) device(s) 613, such as sensors (e.g. barometric sensor), audio and/or video sensors and recording devices (e.g. cameras, microphones, speakers), and other peripheral devices for various inputs and/or outputs. A geolocation service 614 is also included and performs the function as discussed with geolocation service 152 of FIG. 2.

UAV 150 includes a computing device 601, which includes a processor 602. A memory 603 is included as part of computing device 601, but in other embodiments, memory 603 may be separate from the computing device 601. Memory 603 stores instructions that when executed by processor 602 cause the UAV 150 to perform various operations dependent on the particular software being executed. In one embodiment, memory 603 contains a set of flight operation instructions 604 for controlling the flight of the UAV, geolocation instructions 605 for determining the geolocation of UAV 150, radio frame instructions 606 for preparing radio frame format of the information that are to be broadcast and a collision avoidance instructions 607 for determining potential collisions with other UAVs when broadcasts from other UAVs are received. The various instructions perform the operations as described earlier in regards to FIGS. 3-11.

The various instructions (e.g. 604, 605, 606, 607) may be a computer program comprising instructions which, when executed by the processor 602, cause the UAV 150 to perform the method of broadcasting the geolocation information and the other information of the UAV as described above. Memory 603 may be a computer-readable storage medium storing instructions which, when executed by the processor 602, cause UAV 150 to perform the method of broadcasting the geolocation information and the other information of the UAV as described above.

UAV 150 also includes a radio 620, which includes a receiver 621 and transmitter 622 (or a combined transceiver) for providing respective receive and transmit functions for wireless communication. Radio 620 may have more than one receiver or transmitter or, alternatively, a single receiver and transmitter may operate as a virtual radio to provide for more than one radio operation. In one embodiment, radio 620 may operate using one or more of the following protocols or standards:

third generation (3G) radio communication,
fourth generation (4G) radio communication,
4G Long Term Evolution (LTE),
fifth generation (5G) radio communication,
5G New Radio (NR or NX) radio communication,
802.11 radio communication (WiFi),
802.15.4 radio communication,
wireless personal area network radio communication,
Internet of Things (IoT) radio communication, and
low-power wide area network radio communication The radio wirelessly communicates with the radio network access device when broadcasting the geolocation information and the other information and communicates with other UAVs when communicating using peer-to-peer communication, such as the sidelink communication. Likewise, when geolocation broadcasts from other vehicles are received by receiver 621, the received information is processed by processor 602. As noted above, the received information may be used to relay the broadcast by retransmitting the broadcast, either utilizing the same protocol or a different protocol; or the received information may be used to determine a possible collision. In one embodiment, geolocation instructions 605 may be used to determine the location of the broadcasting vehicle and collision avoidance instructions 607 may be used to detect and avoid possible collisions. In one embodiment, a timer 608 is included in computing device 601, to determine any stale information that may be received in a broadcast. Stale information, for example, is information on the location of a UAV that no longer represents the current location of that UAV. Information determined to be stale may be deleted.

Figure 14:
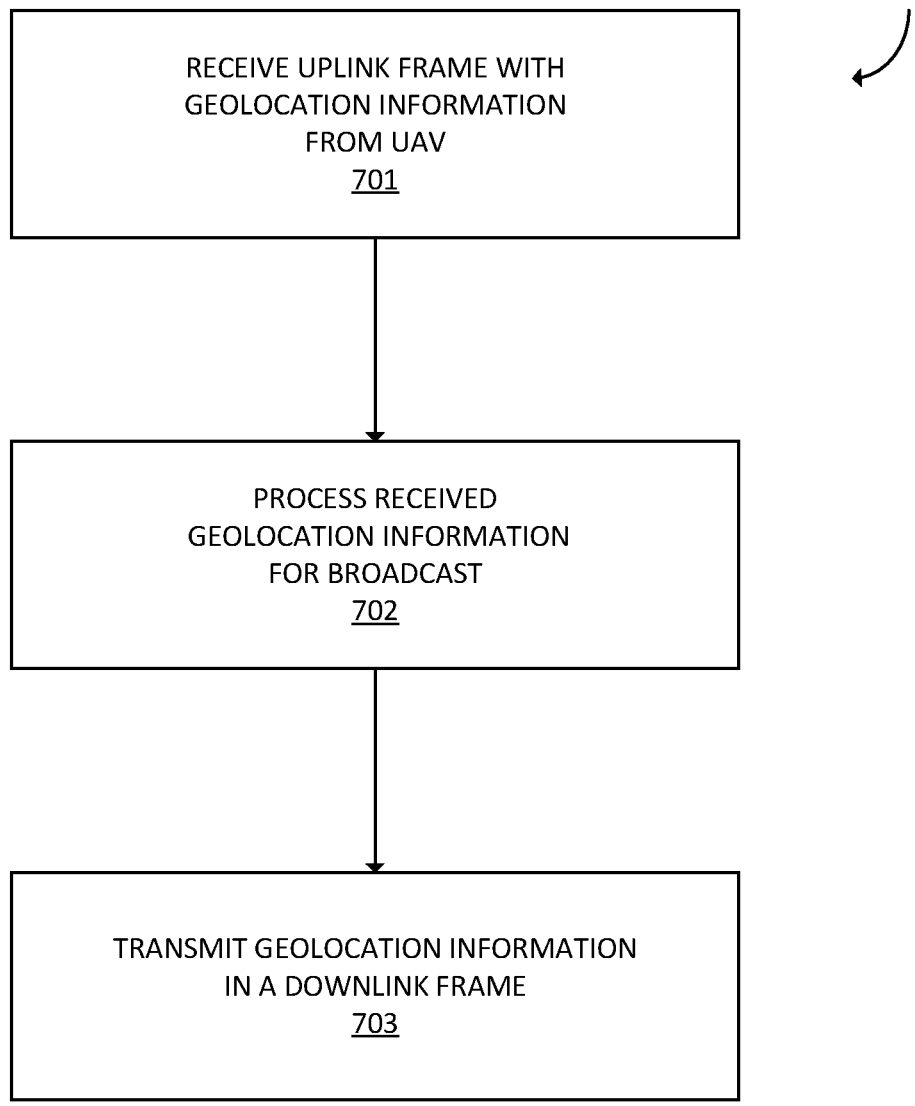
FIG. 14 illustrates a method for rebroadcasting geolocation information received in an uplink frame from an UAV at a network node and transmitting the geolocation information in a downlink frame according to one embodiment.

FIG. 14 illustrates one embodiment of a method for a network node to rebroadcast geolocation information of an UAV received at the network node. The method is illustrated in a flow chart 700. The network node may be a radio network access device (e.g. radio network access device 141) or another node of network 140. The network node receives geolocation information and the other information associated with UAV 150 in a radio frame sent in an uplink transmission from the UAV 150, in which the geolocation information includes information identifying the current geolocation of the UAV 150 (block 701). The network node processes the received radio frame (block 702) and transmits the information identifying the current geolocation of the UAV as a rebroadcast in a downlink transmission to one or more other UAVs (block 703).

Figure 15:
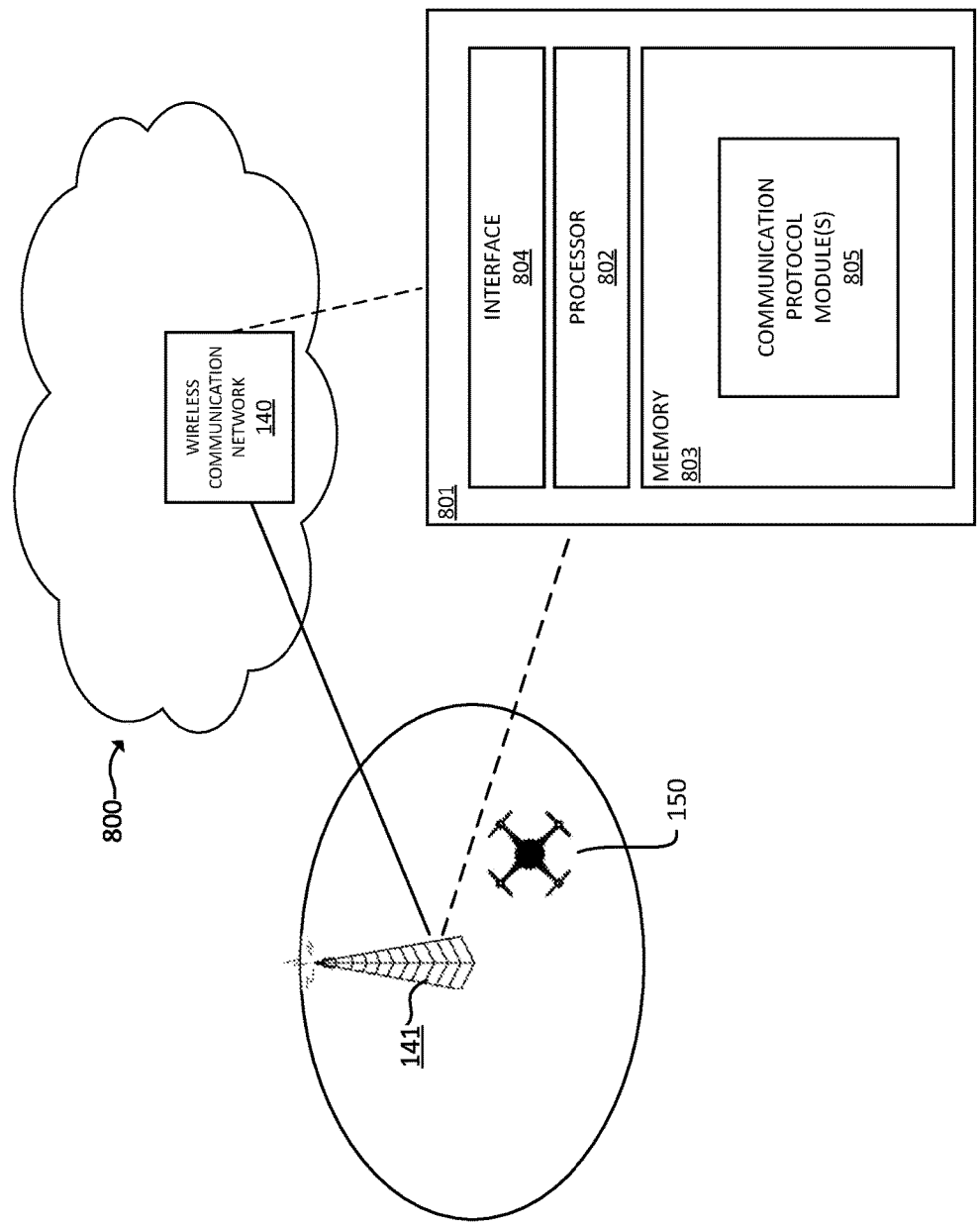
FIG. 15 illustrates components for a network node according to one embodiment.

FIG. 15 shows a network 800 that includes wireless communication network 140, in which UAV 150 is operating in vicinity of one of the radio network access devices 141. In this embodiment, network 800 is a larger network to which wireless communication network 140 belongs or interfaces with. In one embodiment, network 800 may include UTM 110 of FIG. 1. A network node 801 is shown having an interface 804, processor 802 and memory 803. Network node 801 may be functionally located at radio network access device 141 to perform operations at that location or may be functionally located elsewhere within wireless communication network 140. Network node 801 may be part of a RAN. Processor 802 performs processing operations and in which memory 803 may include program instructions that may be run on processor 802. Interface 804 may include radio components (transmitter and receiver) if the node is located at radio network access device 141. If interface 804 is located elsewhere, it provides coupling to other nodes in the network 140 or 800. The components of the example node 801 are each depicted as separate boxes located within a single larger box for reasons of simplicity in describing certain aspects and features of the network node 801. In practice, however, one or more of the components illustrated may reside at other nodes on the network 140.

As noted above in describing the broadcasting of geolocation information from UAV 150, one technique for the broadcast is to transmit the geolocation information and the other information to the radio network access device 141 in an uplink radio frame. Either the network node 801 at the radio network access device 141 or another network node in network 140 determines which vehicles (e.g. UAVs) are in the coverage area of radio network access device 141. Typically, devices in the coverage area of a particular radio network access device are in communication with that radio network access device. Then, network node 801 either relays the received broadcast information or processes the broadcast information and generates its own information package regarding UAV 150's geolocation. This information is then transmitted to the various aerial vehicles in the coverage area in downlink communication radio frames. Either way, the information sent from UAV 150 to the radio network access device 141 in the uplink transmission is then transmitted in a downlink broadcast to other aerial vehicles that are in communication with the radio network access device 141.

In embodiments where the communication protocol utilizes headers, beacons or probes (e.g. WiFi communications), the radio network access device may receive and rebroadcast the received broadcast from UAV 150 in those mediums. For 3GPP (e.g. 3G/4G/5G) communication protocols, control channels may be used for the retransmission of the broadcast. For example, the afore-mentioned PBCCH channel may be used. Another control channel for downlink transmission is Cell Broadcast Channel (CBCH). Other channels may be used as well.

Furthermore, similar to the UAV, the network node may receive the original broadcast using one communication protocol and rebroadcast the information from UAV 150 using a different communication protocol. Thus, different communication protocols may be utilized in the uplink and downlink communications. In one embodiment, a communication protocol module(s) 805 may reside in memory containing instructions to run separate protocols. Thus, a UAV using one communication protocol may broadcast its geolocation information to another UAV, using a different communication protocol, by having network node 801 provide the conversion of the broadcast from a first communication protocol to a second communication protocol. In this manner, UAVs using different communication protocols may still exchange current geolocation information via network node 801.

Regarding the retransmission, network node 801 may receive additional information from another entity, other than UAV 150. This additional information may be added to the downlink transmission. For example, in one embodiment, network node 801, in way of radio network access device 141, may receive ADS-B information and include information obtained from the ADS-B, or information that is filtered, in the downlink transmission.

Figure 16:
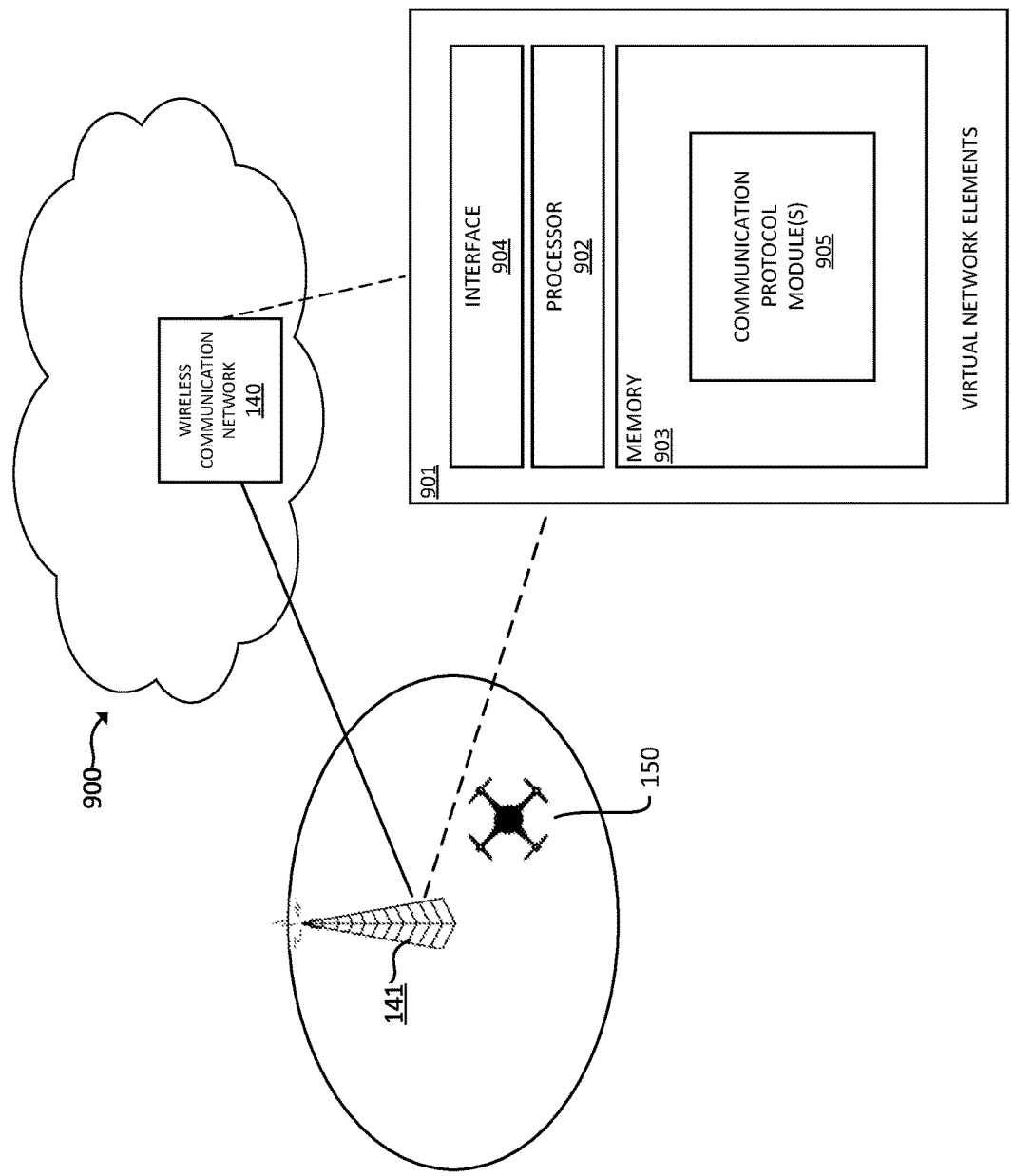
FIG. 16 illustrates an alternative implementation of components for a network node having virtual network elements according to one embodiment.

FIG. 16 shows a network 900 that includes wireless communication network 140, in which UAV 150 is operating in the vicinity of one of the radio network access devices 141. Network node 901 is similar to network node 801 of FIG. 15. That is processor 902, memory 903, interface 904 and communication protocol module(s) 905 are functionally similar to respective components 802-805 of FIG. 15, except that network node 901 may have virtual network elements. The processor 902 or memory 903 may reside elsewhere and not necessarily at network node 901. In some instance one or more of the elements may reside in the cloud.

It is to be noted that memory 803 and 903 may store code (which is composed of software instructions and which is sometimes referred to as computer program code or a computer program) and/or data using machine-readable (e.g., computer-readable) media, such as computer-readable storage media as described earlier in the disclosure. The instructions (e.g. computer program) executed on the processor cause the network node 801, 901 to receive and rebroadcast the geolocation information and the other information of an UAV as described above. Memory 803, 903 may be a computer-readable storage medium storing instructions which, when executed by the processor 802, 902, cause the network node 801, 901 to perform the method of receiving and rebroadcasting the geolocation information and the other information of an UAV as described above.

By implementing the disclosed method and apparatus, a geolocation capability is made available for aerial vehicles (such as UAVs) at lower altitudes at frequencies typically not used for commercial aircraft control at higher altitudes. UAVs may now implement distributed local decision logic to do collision avoidance based on the geolocation information. Furthermore, other than geolocation information, UAVs may broadcast the other information pertaining to the vehicle or the flight path taken, as well as broadcast alerts and warnings. Such warnings may include local weather conditions along the flight path of the UAV.

What is claimed is:

1. A method for an Unmanned Aerial Vehicle (UAV) broadcasting geolocation information of the UAV, comprising:
    determining, by the UAV, current geolocation of the UAV by communicating with a geolocation service and utilizing the geolocation service to geolocate the UAV;
    preparing, by the UAV, a radio frame that includes geolocation information identifying the current geolocation of the UAV, wherein the prepared radio frame is for a radio protocol of a 3rd Generation Partnership Project (3GPP) radio protocol;
    preparing, by the UAV, other information associated with the UAV for inclusion in the radio frame;
    determining whether other vehicles are detected, wherein in an affirmative, waypoint information is added to the other information in the radio frame;
    receiving a transmission from a second UAV, wherein a communication protocol used to receive the transmission from the second UAV is different than the 3GPP radio protocol used for transmitting the radio frame by the UAV; and transmitting, by the UAV, the radio frame that includes the geolocation information and the other information and retransmitting information contained in the transmission received from the second UAV, by including the information contained in the transmission received from the second UAV in the other information of the radio frame, wherein the transmitting the radio frame utilizes the 3GPP radio protocol to broadcast the radio frame.

2. The method of claim 1, wherein the transmitting the radio frame includes transmitting the radio frame in a control frame.

3. The method of claim 1, wherein the transmitting the radio frame includes transmitting the radio frame in a header, a beacon or a probe.

4. The method of claim 1, wherein the transmitting the radio frame includes transmitting the radio frame in a control channel that communicates with a base station or an access point.

5. The method of claim 4, wherein the transmitting the radio frame includes transmitting the radio frame in a Packet Broadcast Control Channel (PBCCH) to the base station.

6. The method of claim 1, wherein the preparing the radio frame further includes providing latitude, longitude, altitude and velocity information pertaining to the current geolocation of the UAV.

7. The method of claim 6, wherein the preparing the radio frame further includes providing direction information pertaining to a direction of travel of the UAV at the current geolocation.

8. The method of claim 1, wherein the preparing the radio frame further includes providing other information pertaining to one or more of:
   status of a battery on the UAV;
   identity of the UAV;
   type of the UAV;
   length of the UAV;
   vehicle type of the UAV;
   capabilities of the UAV;
   vehicle vendor of the UAV;
   firmware utilized by the UAV;
   software utilized by the UAV;
   warnings or alerts from the UAV; and
   operational mode of the UAV.

9. The method of claim 1 further comprising:
   receiving geolocation information broadcast from the second UAV; and
   utilizing the received geolocation information of the second UAV to avoid collision with the second UAV.

10. The method of claim 9, wherein the receiving the geolocation information broadcast from the second UAV is via a base station or an access point.

11. The method of claim 9, wherein the receiving the geolocation information broadcast from the second UAV is via a direct peer-to-peer sidelink communication with the second UAV.

12. The method of claim 9 further comprising:
   utilizing a timer to identify stale geolocation information broadcast from the second UAV.

13. The method of claim 1, wherein the transmitting the radio frame includes transmitting the radio frame using a communication protocol based on:
   third generation (3G) radio communication;
   fourth generation (4G) radio communication;
   4G Long Term Evolution (LTE);
   fifth generation (5G) radio communication; or
   5G New Radio (NR) radio communication.

14. A computer-readable storage medium storing instructions which, when executed by a processor of an Unmanned Aerial Vehicle (UAV), cause the UAV to perform operations comprising:
   determining, by the UAV, current geolocation of the UAV by communicating with a geolocation service and utilizing the geolocation service to geolocate the UAV;
   preparing, by the UAV, a radio frame that includes geolocation information identifying the current geolocation of the UAV, wherein the prepared radio frame is for a radio protocol of a 3rd Generation Partnership Project (3GPP) radio protocol;
   preparing, by the UAV, other information associated with the UAV for inclusion in the radio frame;
   determining whether other vehicles are detected, wherein in an affirmative, waypoint information is added to the other information in the radio frame;
   receiving a transmission from a second UAV, wherein a communication protocol used to receive the transmission from the second UAV is different than the 3GPP radio protocol used for transmitting the radio frame by the UAV; and
   transmitting, by the UAV, the radio frame that includes the geolocation information and the other information and retransmitting information contained in the transmission received from the second UAV, by including the information contained in the transmission received from the second UAV in the other information of the radio frame, wherein the transmitting the radio frame utilizes the 3GPP radio protocol to broadcast the radio frame.

* * * * *